(12) United States Patent
Camozzi et al.

(10) Patent No.: US 12,345,306 B2
(45) Date of Patent: Jul. 1, 2025

(54) DEVICE AND METHOD FOR A SIMULTANEOUS DETECTION OF TANGENTIAL AND NORMAL FORCES ACTING IN A DETECTION POINT AT A BRAKE CALIPER OR AT A SUSPENSION OF A VEHICLE WHEEL

(71) Applicant: BREMBO S.p.A., Curno (IT)

(72) Inventors: Francesco Camozzi, Curno (IT); Andrea Milanesi, Curno (IT); Pietro Barale, Curno (IT); Leonardo De Novellis, Curno (IT)

(73) Assignee: Brembo S.p.A., Curno (IT)

( * ) Notice: Subject to any disclaimer, the term of this patent is extended or adjusted under 35 U.S.C. 154(b) by 873 days.

(21) Appl. No.: 17/618,245

(22) PCT Filed: Jun. 12, 2020

(86) PCT No.: PCT/IB2020/055531
§ 371 (c)(1),
(2) Date: Dec. 10, 2021

(87) PCT Pub. No.: WO2020/250191
PCT Pub. Date: Dec. 17, 2020

(65) Prior Publication Data
US 2022/0260126 A1    Aug. 18, 2022

(30) Foreign Application Priority Data

Jun. 13, 2019    (IT) ................. 102019000008865

(51) Int. Cl.
| | | |
|---|---|---|
| *F16D 66/00* | (2006.01) | |
| *F16D 55/22* | (2006.01) | |
| *G01L 1/18* | (2006.01) | |
| *G01L 1/22* | (2006.01) | |
| *G01L 5/162* | (2020.01) | |
| *F16D 55/00* | (2006.01) | |

(52) U.S. Cl.
CPC ............. *F16D 66/00* (2013.01); *F16D 55/22* (2013.01); *G01L 1/18* (2013.01); *G01L 1/2206* (2013.01);
(Continued)

(58) Field of Classification Search
CPC .. F16D 66/00; F16D 55/22; F16D 2055/0016; F16D 2066/001;
(Continued)

(56) References Cited

U.S. PATENT DOCUMENTS

| | | |
|---|---|---|
| 4,621,533 A | 11/1986 | Gindy |
| 10,126,186 B2 | 11/2018 | Berme et al. |

(Continued)

FOREIGN PATENT DOCUMENTS

| | | | |
|---|---|---|---|
| JP | 04231827 A | * | 8/1992 |
| JP | 06123665 A | * | 5/1994 |

(Continued)

OTHER PUBLICATIONS

JP-04231827-A, English Translation (Year: 1992).*

(Continued)

*Primary Examiner* — Ryan D Walsh
(74) *Attorney, Agent, or Firm* — Marshall & Melhorn, LLC

(57) ABSTRACT

A detection device for simultaneously detecting tangential and normal components of a force acting at a brake caliper or suspension of a vehicle wheel has a plate-shaped casing having a force sensor assembly for detecting normal and tangential force components and for generating one or more electrical signals representative of detected normal and tangential force components. The detection device has an electrical interface for conducting and making the one or more generated electrical signals available. A device and a system for determining a braking force due to action of a (Continued)

vehicle brake caliper and a brake caliper system with a braking force estimation function are also provided. Methods for simultaneously detecting tangential and normal components of a force acting at a brake caliper or exchanged between an axle and a suspension of the wheel and for determining a braking force due to action of a vehicle brake caliper are also provided.

27 Claims, 10 Drawing Sheets

(52) U.S. Cl.
CPC ............ *G01L 1/2281* (2013.01); *G01L 5/162* (2013.01); *F16D 2055/0016* (2013.01); *F16D 2066/001* (2013.01); *F16D 2066/005* (2013.01)

(58) Field of Classification Search
CPC ... F16D 2066/005; G01L 1/18; G01L 1/2206; G01L 1/2281; G01L 5/162
See application file for complete search history.

(56) References Cited

U.S. PATENT DOCUMENTS

| | | | |
|---|---|---|---|
| 10,564,059 B2 | 2/2020 | Okada et al. | |
| 12,162,452 B2* | 12/2024 | Camozzi | F16D 65/0056 |
| 2012/0103733 A1* | 5/2012 | Sekiguchi | F16D 65/18 188/72.1 |
| 2017/0082163 A1* | 3/2017 | Serra | B60T 17/22 |
| 2017/0267220 A1* | 9/2017 | Serra | B60T 8/172 |
| 2018/0024015 A1 | 1/2018 | Berme et al. | |
| 2019/0113407 A1 | 4/2019 | Okada et al. | |
| 2024/0167526 A1* | 5/2024 | Meldini | F16D 55/00 |

FOREIGN PATENT DOCUMENTS

| | | | | |
|---|---|---|---|---|
| JP | 06288798 A | * | 10/1994 | |
| JP | 07190865 A | * | 7/1995 | |
| JP | 2011033350 A | * | 2/2011 | |
| JP | 2015172568 A | * | 10/2015 | G01L 1/22 |
| WO | WO-2011030839 A1 | * | 3/2011 | F16D 65/18 |

OTHER PUBLICATIONS

JP-06123665-A, English Translation (Year: 1994).*
JP-06288798-A, English Translation (Year: 1994).*
JP-07190865-A, English Translation (Year: 1995).*
JP-2011033350-A, English Translation (Year: 2011).*
JP-2015172568-A, English Translation (Year: 2015).*
WO-2011030839-A1, English Translation (Year: 2011).*
European Patent Office, International Search Report with Written Opinion, issued in PCT/IB2020/055531, Sep. 20, 2020, 10 pages, European Patent Office, Rijswijk, Netherlands.

* cited by examiner

DEVICE AND METHOD FOR A SIMULTANEOUS DETECTION OF TANGENTIAL AND NORMAL FORCES ACTING IN A DETECTION POINT AT A BRAKE CALIPER OR AT A SUSPENSION OF A VEHICLE WHEEL

CROSS-REFERENCE TO RELATED APPLICATIONS

This application is a National Phase Application of PCT International Application No. PCT/IB2020/055531, having an International Filing Date of Jun. 12, 2020 which claims priority to Italian Application No. 102019000008865 filed Jun. 13, 2019, each of which is hereby incorporated by reference in its entirety.

FIELD OF THE INVENTION

It is the object of the present invention a force detection device, and a related method, based on sensors capable of providing electrical or electronic signals.

More specifically, it is the object of the present invention a device and a method for the simultaneous detection of tangential and normal forces acting in a detection point at a brake caliper or a suspension of a vehicle wheel.

It is a further object of the present invention a brake caliper system comprising the aforesaid device.

Furthermore, it is the object of the present invention a device, a system and a method for determining a braking force and/or torque due to the action of a vehicle brake caliper, which use the aforesaid detection device.

Background Art

For the control, monitoring and implementation of a braking system, for example, an electronically controlled disc brake system, it is very useful to know, in real time, as precisely as possible, the braking force or torque value exerted by the brake calipers of the braking system during a braking action.

However, it is difficult to directly, precisely and reliably measure the braking force and/or torque, and therefore such value is typically estimated and/or calculated indirectly, with the drawback that such estimate or calculation does not fully satisfy the necessary precision requirements.

In this regard, the background art shows a tendency to determine the braking torque and/or force on the basis of measurements which are indirect, but relate to quantities strictly related to the braking torque and/or force, for example, forces acting at different points of the brake caliper.

On the other hand, it is necessary to take into account the further need to use sensor devices which are as miniaturized and compact as possible, such that they may be easily integrated into the braking system without causing functional problems.

In this regard, some compact sensor devices are known, capable of detecting and/or measuring the lateral (shear) forces or the normal forces acting between the brake caliper support and the vehicle hub by using stress sensors.

Such known devices, however, are capable of determining the braking force and/or torque, on the basis of the measurements of lateral forces or axial forces that are carried out, with poor precision and on a relatively limited range of measurable forces.

Furthermore, in the case of devices for measuring the shear force alone, the result provided by such devices is not completely independent of the clamping torque of the screw used to fasten the two components between which the forces are measured. In other words, the result is not independent of axial forces, which constitute a disturbance with respect to the precision of the estimation of the braking force and/or torque.

In light of the above, the need to devise devices and methods for more precisely determining the braking torque and/or force is strongly felt.

Closely linked to the aforementioned requirement, there is the further need to devise devices and methods for a simultaneous detection of tangential and normal forces acting at one or more detection points, at a brake caliper and/or suspension of a vehicle wheel, having features of compactness and precision such as to be effectively usable in the context of a braking system.

In fact, obtaining precise measurements of tangential and normal forces acting at one or more detection points, for example, of a brake caliper, is in itself very useful, in general, for numerous applications in the electronic control of a braking system.

Among the most useful applications, there is that of being capable of estimating and/or determining the braking force and/or torque acting in real time during a braking action on the basis of the normal and tangential force components detected, responding to one of the aforementioned needs.

Further requirements desired in a device for measuring tangential and normal forces acting at one point, applicable to this context, are compactness and, in particular, axial dimensions, robustness such as to ensure operation in stringent environmental conditions, simplicity of assembly (using, for example, the fastening systems already provided to fasten the brake caliper to the hub holder), versatility of use, in the contexts of fixed or floating caliper disc brakes, with axial or radial assembly and at several points and/or joints and/or junctions of such systems, and the ability to offer reliable measurements over a wide temperature range.

As already noted, the abovementioned needs are not fully satisfied by the solutions made available at present by the background art.

Solution

It is an object of the present invention to provide a device for the simultaneous detection of the normal force (or of the module of the normal force) and of one or more tangential force components acting in a detection portion at a brake caliper or a suspension of a vehicle wheel, which allows to at least partially obviate the drawbacks complained here above with reference to the background art, and to fulfill the abovementioned requirements particularly felt in the technical sector taken into consideration.

This and other objects are achieved by a detection device for detecting tangential and normal force components as described and claimed herein.

It is a further object of the present invention to provide a system for detecting tangential and normal force components employing the detection device as described and claimed herein.

This and other objects are achieved by a system for detecting tangential and normal force components as described and claimed herein.

It is a further object of the present invention to provide a method for simultaneously detecting the tangential and normal components of a force acting at a brake caliper of a vehicle wheel or of a force exchanged between an axle and a wheel suspension.

This and other objects are achieved by a method for simultaneously detecting tangential and normal force components as described and claimed herein.

It is a further object of the present invention to provide a method for determining a braking force and/or torque due to the action of a vehicle brake caliper, based on the method for simultaneously detecting the tangential and normal force components.

This and other objects are achieved by a method for determining a braking force and/or torque as described and claimed herein.

Lastly, it is the object of the present invention to provide a brake caliper system with a braking force estimation function.

This and other objects are achieved by a brake caliper system with a braking force estimation function as described and claimed herein.

BRIEF DESCRIPTION OF THE DRAWINGS

Further features and advantages of the devices, methods and systems in accordance with the invention will become apparent from the following description of preferred embodiments thereof, given by way of indication and not by way of limitation, with reference to the accompanying figures, in which.

DETAILED DESCRIPTION OF THE INVENTION

Figure 1:
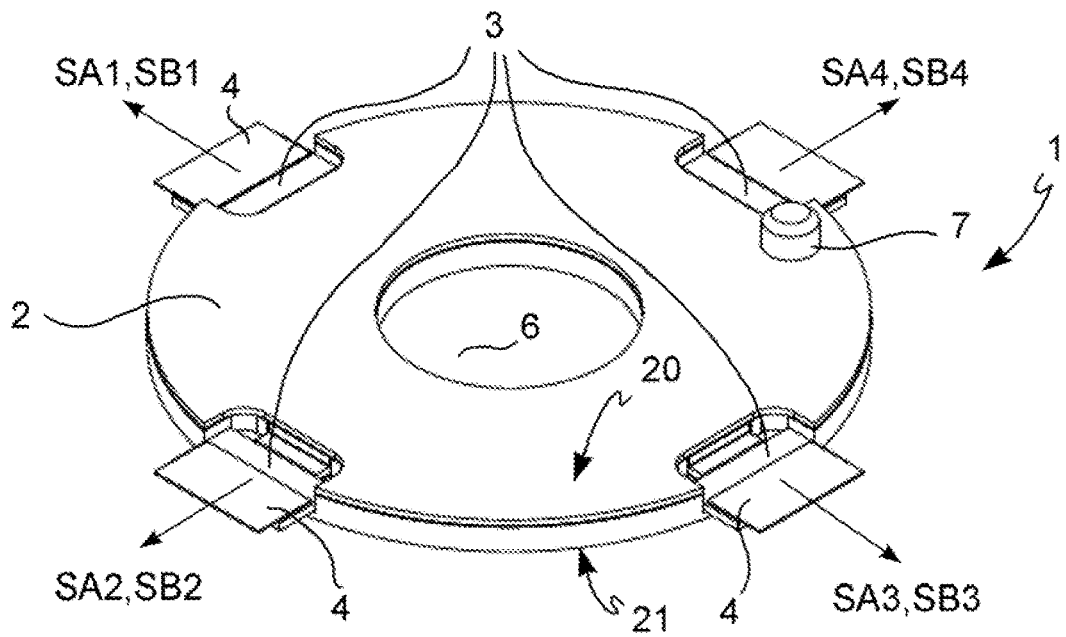
FIG. 1 is a perspective view of a device for the simultaneous detection of the tangential and normal force components, according to an embodiment comprised in the invention.

With reference to FIGS. 1-7, a detection device 1 is now described, for the simultaneous detection of normal and tangential components of a force acting in a detection portion Z at a brake caliper 100 or suspension 200 of a vehicle wheel.

The device 1 comprises a plate-shaped casing 2, a force sensor assembly 3 and an electrical interface 4.

The plate-shaped casing 2 mainly extends along a reference plane P (indicated in FIG. 2 as the plane with respect to which the top view of the device is shown; on the plane P, as detailed below, the resulting tangential force lays).

Such casing 2 is formed by two portions constrained and/or welded to each other. The first portion 20 has, towards the outside of the casing, a first plane face, parallel to the reference plane P, adapted to be placed in close contact with the aforesaid detection portion Z (for example, belonging to the brake caliper, or an attachment point of the brake caliper to a support). The second portion 21 has, towards the outside of the casing, a second plane face, parallel to the reference plane P, adapted to be placed in close contact with the fastening and clamping means 5.

The force sensor assembly 3 is housed in the casing 2 and is mechanically constrained and/or welded to the aforesaid first portion 20 and second portion 21 of the casing 2.

The force sensor assembly 3 is configured to detect both a normal force component fn, along a direction normal to the reference plane P, which is transmitted to the sensor by contact and pressure by the casing 2, and at least one tangential force component ft, along a respective at least one tangential direction defined by the reference plane P (or lying therein), which is transmitted to the sensor by contact and pressure by the casing 2.

The aforesaid normal force component fn is representative of a normal force Fn acting on the casing 2 (for example, the normal force to which the first and second face of the casing 2 are subjected).

The aforesaid at least one tangential force component ft is representative of a lateral force Ft acting on the casing 2 (for example, the tangential force to which the first and the second face of the casing 2 are subjected).

In fact, the normal and tangential forces acting on the casing 2 determine a deformation of such casing which in turn determines normal (pressure) and tangential or lateral (shear) force components acting on the sensor, due to the mechanical constraint or welding which connects the sensor to each of the faces of the casing 2.

The force sensor assembly 3 is configured to generate, by piezo-resistive effect, one or more electrical signals SA, SB representative of the normal force component fn and of the at least one tangential force component ft detected.

The electrical interface 4 is integrated in the casing 2 and is connected to the force sensor assembly 3 to conduct and make the aforesaid one or more generated electrical signals SA, SB available.

Figure 2:
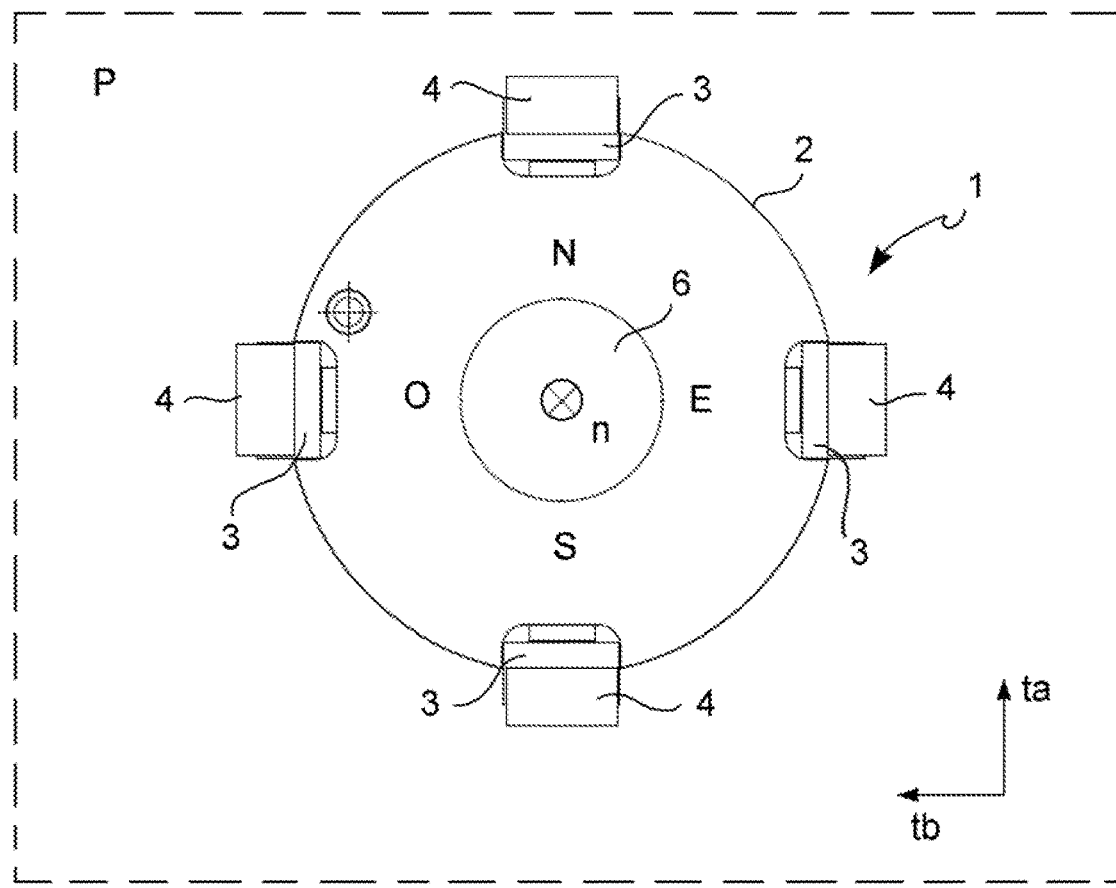
FIGS. 2 and 3 respectively show an orthogonal top view and an exploded perspective view of the device of FIG. 1.
Figure 3:
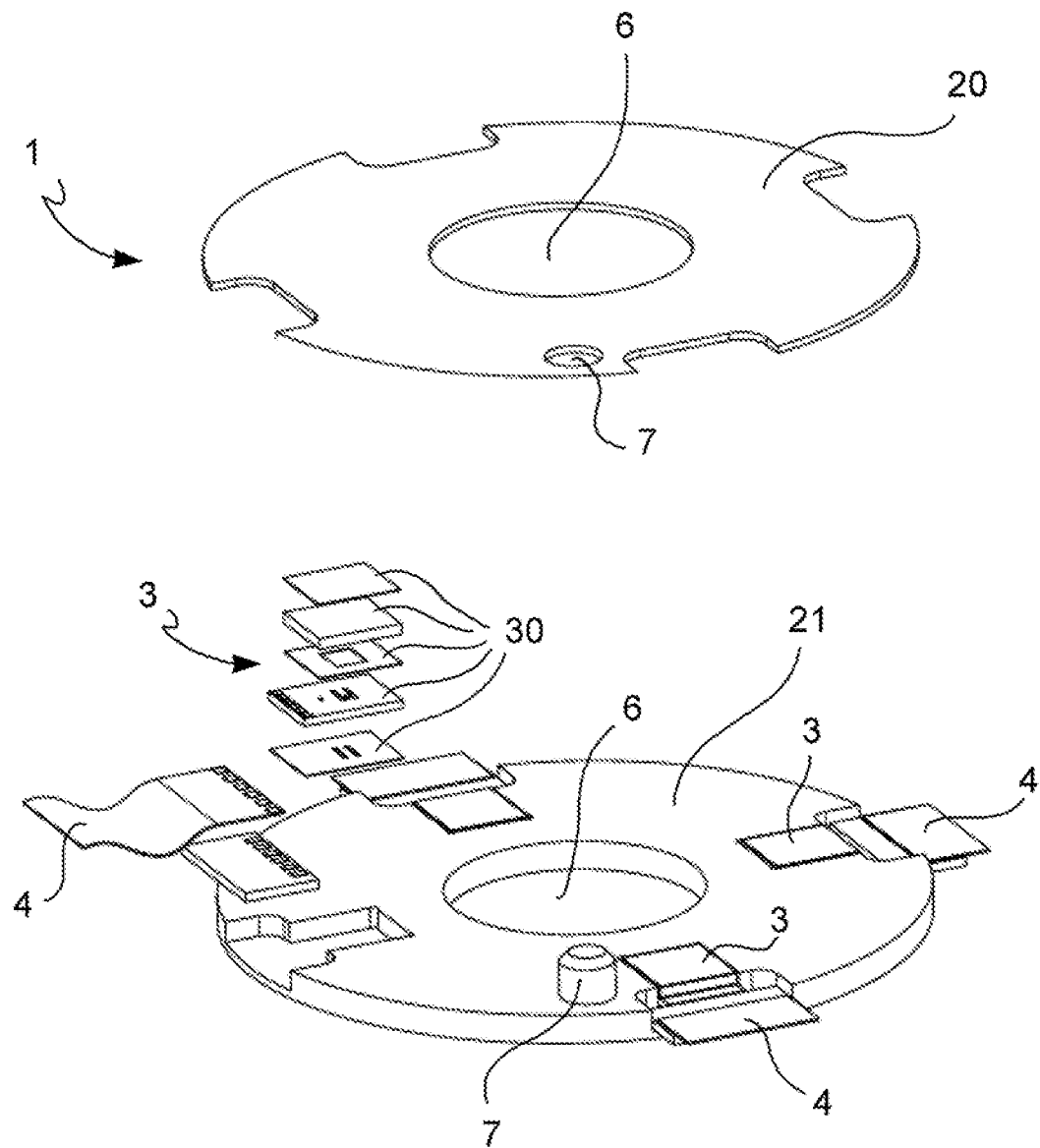

It should be noted that the term "force sensor assembly" (hereinafter, also generically referred to as "force sensor") is used herein in a broad sense, and may also indicate an assembly comprising multiple sensor element groups arranged in several positions of the device, as it will be better described below, and as shown in FIGS. 1-3. Each group of sensor elements may comprise, in turn, one or more sensor elements. Similarly, the electrical interface 4 may comprise a plurality of interface terminals 4, for example, one for each sensor assembly, or one for each sensor element.

A single integrated group of sensor elements 3 (shown in FIG. 4A) may be defined as a "biaxial force sensor" in the sense that it is capable of detecting the force component along the normal direction n and one of the tangential force components, along the tangential direction t (determined by the positioning and/or orientation of the biaxial sensor 3).

Figure 6:
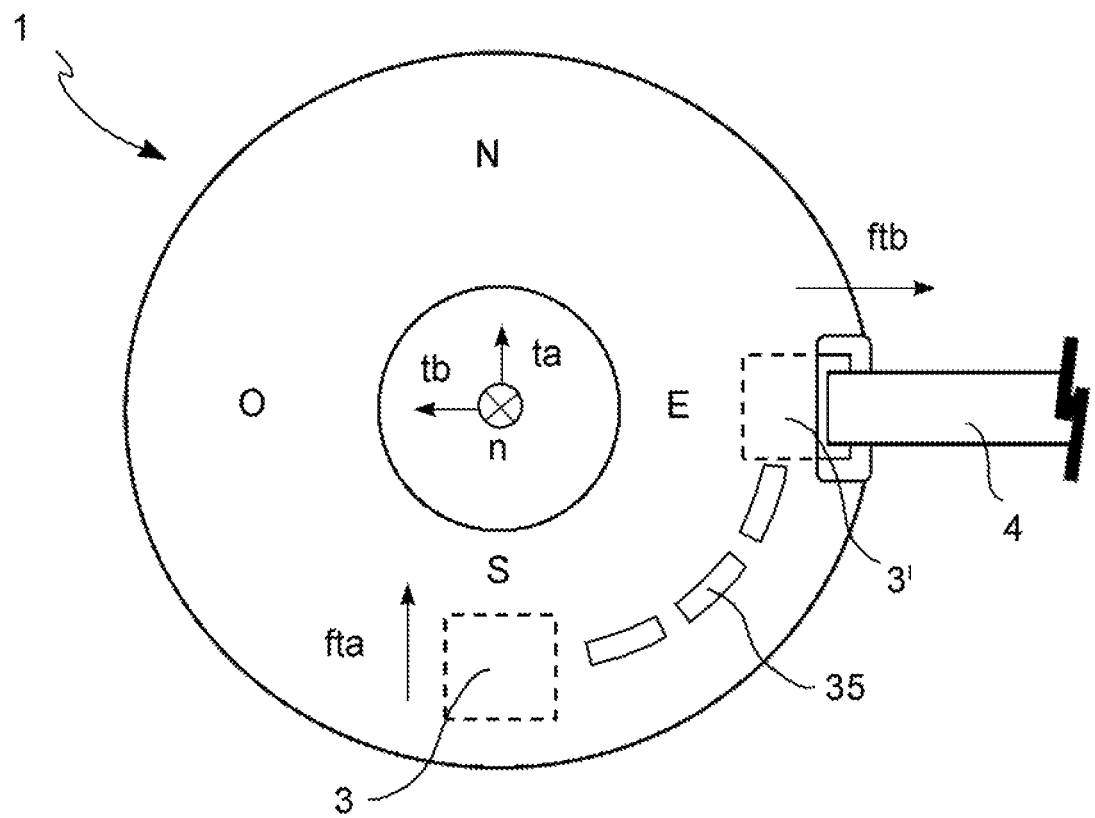
FIG. 6 shows an orthogonal top view of a further embodiment of a device for the simultaneous detection of tangential and normal force components, in accordance with the invention.
Figure 7:
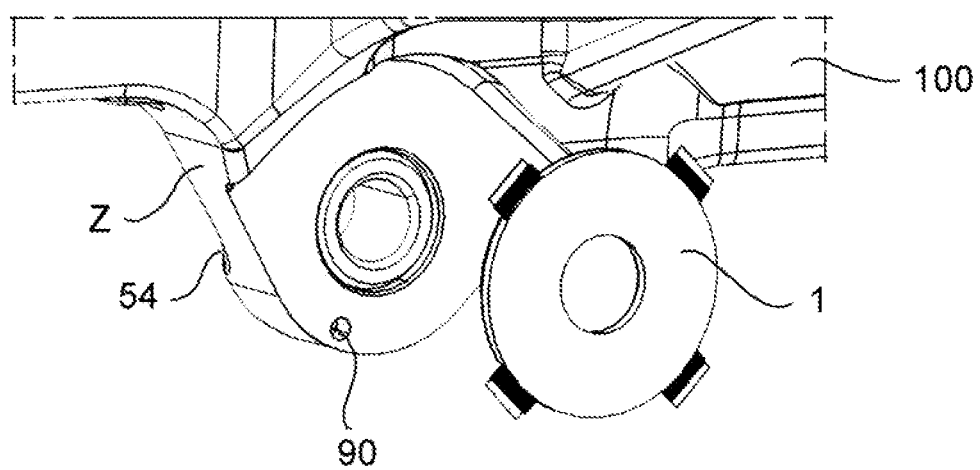
FIG. 7 shows the device of FIG. 1 near an attachment point of a brake caliper, to which it is fastened, in accordance with an application example of the invention.

According to an embodiment (shown, for example, in FIG. 6, but also comprising the cases shown in FIGS. 1 and 2), the device 1 comprises at least two sensor element assemblies 3, 3', arranged orthogonally with respect to each other (for example, in the positions conventionally indicated in FIG. 6 as "S" and "E"; the other combinations N-E, N-O, S-O would obviously be possible). In such case, the force sensor 3, as a whole comprising the at least two aforesaid sensor assemblies, is capable of detecting, in addition to the normal force component acting along the normal direction n, also the two tangential force components, acting along the two tangential directions ta, tb orthogonal to each other, belonging to the plane P. In this sense, such force sensor assembly 3 may be defined as a "triaxial force sensor", such to allow the device 1 to determine the normal force Fn and the tangential force Ft acting on the device 1 on the basis of both the normal force components fn detected by the two sensor assemblies, and the first tangential force component fta and the second tangential force component ftb detected.

In the implementation shown in FIGS. 1-3, the force sensor assembly 3 comprises four sensor assemblies 3, each connected to a respective interface terminal 4, in which each interface terminal 4 is configured to transmit a respective pair of signals generated by the respective sensor element 3 (indicated in FIG. 1 as SA1 and SB1; SA2 and SB2; SA3 and SB3; SA4 and SB4, respectively).

In accordance with an implementation option, the device 1 further comprises at least one opening 6 obtained on the plate-shaped casing 2, adapted to cooperate with external fastening and clamping means 5, to ensure that the device 1 is fastened and pressed to a part of a wheel and/or of a brake caliper 100 and/or of a suspension 200 of a vehicle. Thereby, the casing 2 is subjected to the action of the aforesaid normal and tangential forces, which may vary, with respect to a rest value, for example upon a braking action.

According to an embodiment of the device 1, the aforesaid casing 2 is a disc-like plate-shaped and/or washer-shaped casing, with at least one opening 6 adapted to be traversed by external screw-like fastening and clamping means 5.

According to an implementation option, the device 1 further comprising coupling elements 7, configured to couple with respective parts of the fastening area of the brake or suspension or other wheel part to which the device is to be attached, so as to define a correct mutual fastening position.

As shown in FIG. 1, such coupling elements comprise, for example, a pin 7 which may be attached to a corresponding opening (indicated with reference numeral 90 in FIG. 7) obtained on the point of attachment to the caliper body, so as to ensure the correct angular mounting position of the device. Alternatively, such coupling elements may be obtained by means of a shape coupling between the casing 2 and the brake caliper 100 and/or the fastening and clamping means 5.

As will be better described below, the fastening and the load transfer from the caliper body to the washer device may be, for example, advantageously obtained by clamping the screw already provided for the usual fastening of the brake, or of the caliper body to a respective support.

In several possible implementation options, the casing 2 may be made of different materials, provided they are sufficiently resistant and adapted to transfer, e.g., due to deformation, the forces acting on the casing towards the inside of the casing itself, where the force sensors are housed.

According to an implementation option, the casing 2 is metallic.

According to a more specific preferred implementation option, the aforesaid casing 2 is a casing in stainless steel.

According to several implementation options of the device, different types of sensors (per se known) may be used, capable of performing the functions described above.

In a preferred embodiment, the aforesaid sensors or sensor assemblies or sensor assembly elements are piezo-resistive sensors made with Micro-Electro-Mechanical Systems (MEMS) technology.

In FIG. 3, one of the sensor assemblies 3 is shown by means of an exploded view, which shows the different components 30 of the sensor 3 (which together make, for example, a normal force sensor, a tangential force sensor and a temperature sensor); they may be placed in a seat of the device and electrically connected to an interface 4, in the form of an "interface card" and of the relative wiring 4 protruding from the casing 2.

According to several possible implementation options, the detection device 1 may consist of different parts constrained to each other and/or of different parts which may be detached from and re-connected to each other. In particular, the casing 2 of the device may consist of different parts constrained to each other and/or of different parts which may be detached from and re-connected to each other.

Figure 4A:
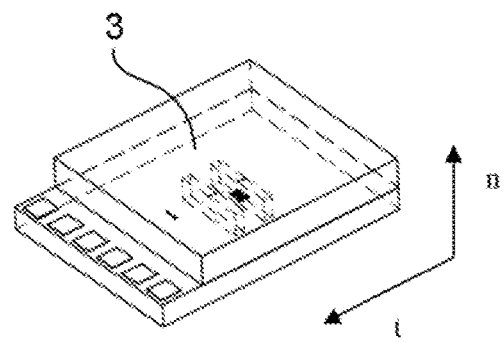
FIGS. 4A and 4B respectively show a perspective view and a partial side section of an embodiment of a force sensor assembly comprised in the detection device in accordance with the invention.
Figure 4B:
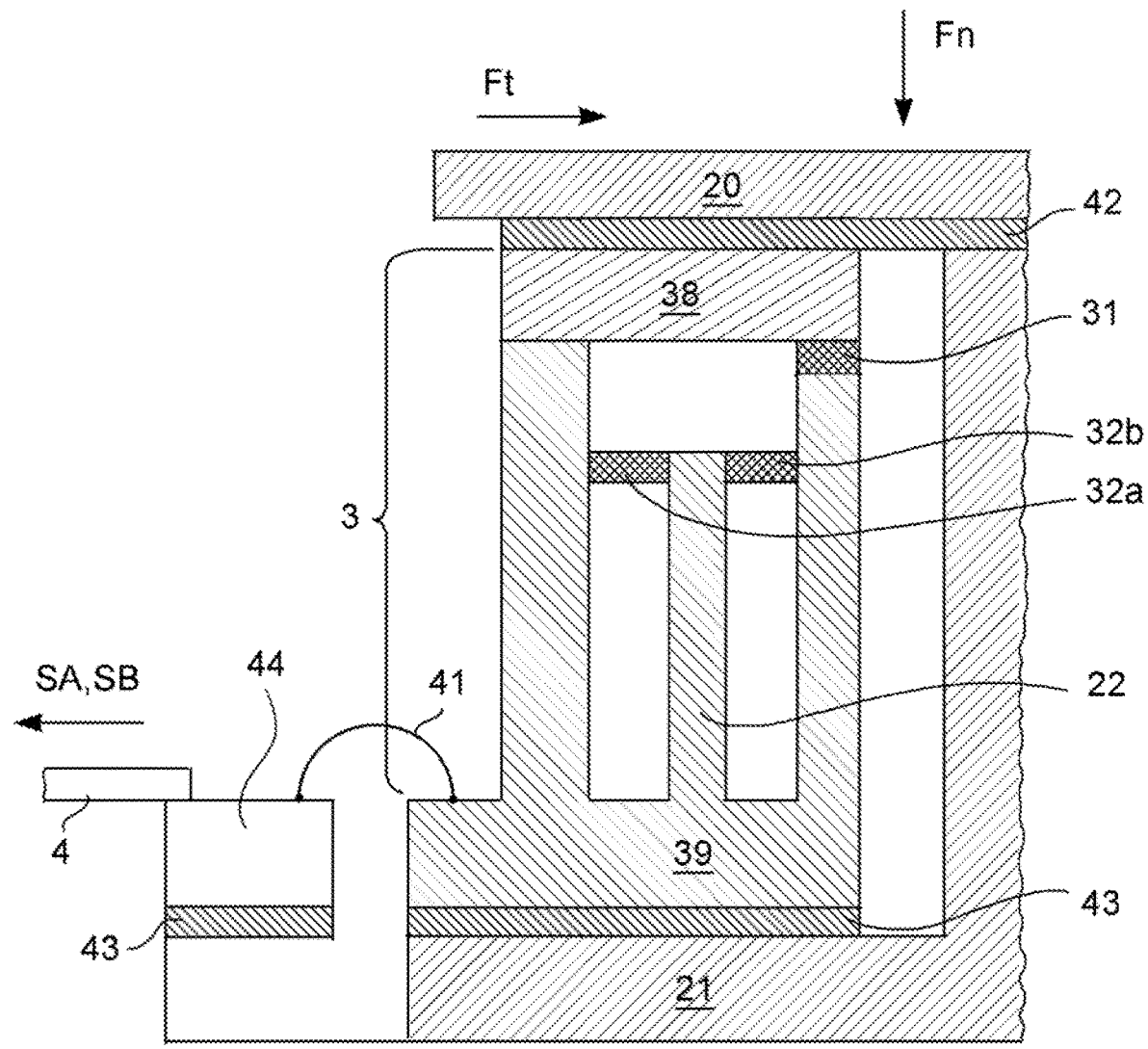

According to an implementation of the device 1, the sensor 3 is mechanically constrained both to the upper portion 20 and to the lower portion 21 of the casing 2 of the device (as shown, for example, in FIG. 4B).

Figure 5:
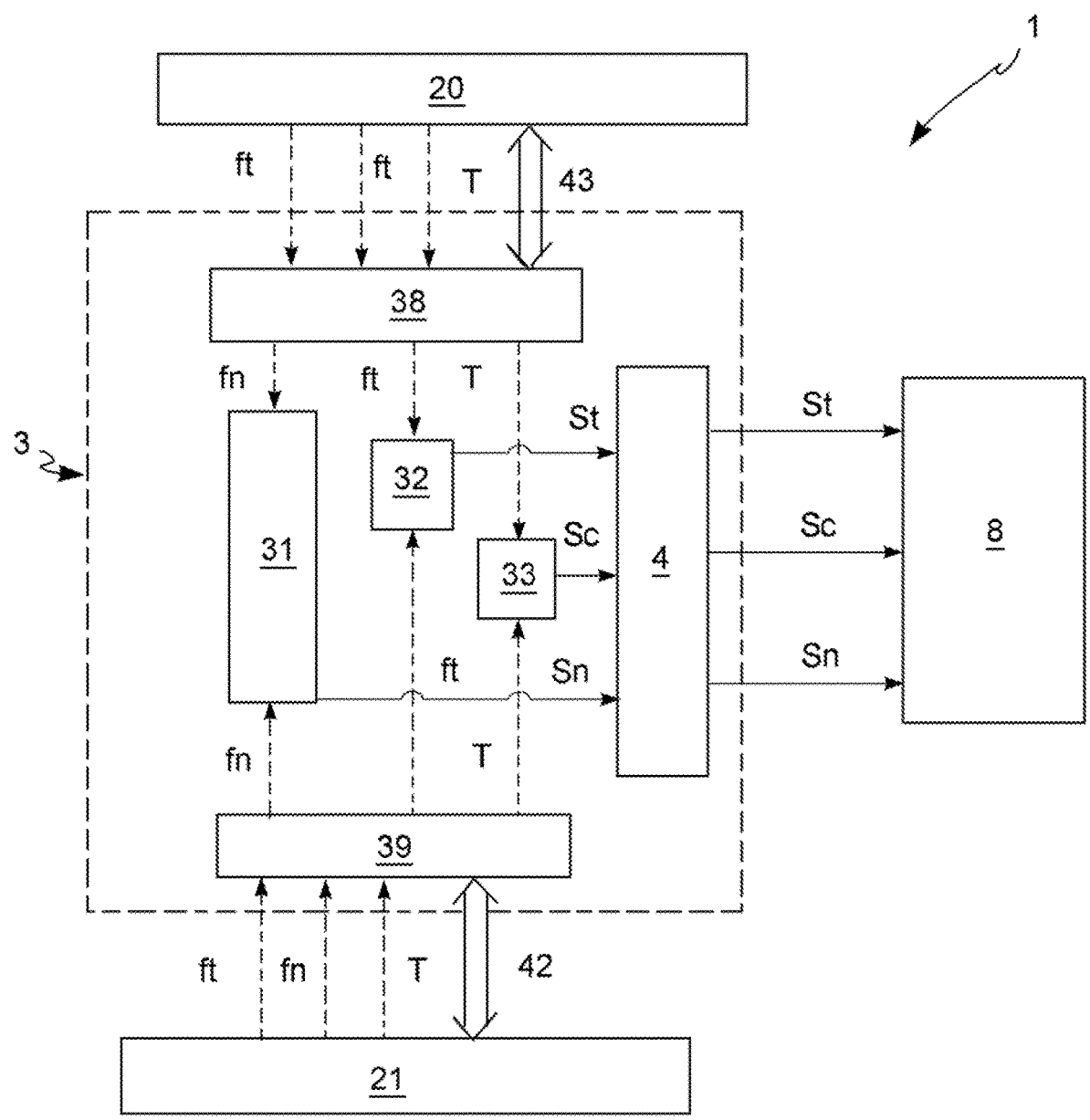
FIG. 5 shows a functional diagram of an embodiment of a force sensor assembly comprised in the detection device in accordance with the invention.

With reference to FIGS. 4 and 5, further details are now described of a biaxial force sensor assembly 3, or of each of the elements comprise in the aforesaid biaxial force sensor 3.

In FIG. 4B, an embodiment is shown in which a biaxial sensor assembly 3 is fastened by brazing or adhesive 42 to the first portion 20 and by adhesive 43 to the second portion 21 of the casing 2, and is connected by means of an electrical wire bonding 41 to the interface card 44 (for example, PCB) and therefore to the terminal 4 (for example, a cable soldered to the interface card) of the electrical interface. The biaxial sensor unit 3 is sensitive to the tangential ft and normal fn components of the force locally acting thereon, components which in turn depend, in a known manner, on the normal Fn and tangential Ft components of the force acting on the faces of the casing 2, and which the casing mechanically transmits to the biaxial sensor 3. In the example shown in FIG. 4B, the biaxial sensor assembly generates the electrical signals SA and SB which are made available on the interface terminal 4.

In accordance with an embodiment of the device 1, the force sensor assembly 3 comprises at least one biaxial force sensor assembly 3, which comprises at least one first normal force sensor element 31 and one second tangential force sensor element 32.

The at least one first normal force sensor element 31 is configured to detect the aforesaid normal force component fn and to generate at least one first electrical signal SA.

The at least one second tangential force sensor element 32 is configured to detect the aforesaid tangential force component ft and to generate at least one second electrical signal SB. The set of the aforesaid at least one first electrical signal SA and at least one second electrical signal SB is representative of each of the detected force components, i.e., both of the normal force component fn detected and of the tangential force component ft detected.

According to an implementation example, the sensor assembly 3 comprises a first chip 38 and a second chip 39 operatively connected with each of the aforesaid at least one first sensor element 31 and at least one second sensor element 32. The first chip 38 is fastened by brazing or adhesive 42 to the first portion 20 of the casing 2, the second chip 39 fastened by adhesive 43 to the second portion 21 of the casing 2. In turn, both the first and the second chip are mechanically constrained to the sensor elements.

According to a particular implementation option, the sensor assembly 3 comprises two second sensor elements (indicated in FIG. 4B as 32*a* and 32*b*).

According to an implementation option of the device (shown in the functional diagram of FIG. 5), the aforesaid at least one first electrical signal SA is an electrical signal Sn representative of the normal force component fn detected, and the aforesaid at least one second electrical signal SB is an electrical signal St representative of the tangential force component ft detected. In this case, therefore, there is a correspondence between each of the signals generated and a respective force component.

In other implementation options, such correspondence may not be there, provided that, both the normal component and the tangential component of the force acting on such sensor or sensor assembly may be simultaneously obtained from the signals generated by the sensor or sensor assembly, in a manner per se known. The signals generated may therefore be more than two, or they may be single-ended signals instead of differential signals, or signals of another type, depending on the specific type of signal generated by the sensor assembly used and by the reading circuit diagram (in fact, reading circuit diagrams, per se known, may be used).

Also in such embodiment, the aforesaid at least one first sensor element 31 and at least one second sensor element 32 (of each of the one or more sensor assemblies 3) are, for example, piezo-resistive sensors made with Micro-Electro-Mechanical Systems (MEMS) technology.

In accordance with an embodiment, the device 1 comprises a plurality of the aforesaid biaxial force sensor assemblies 3, arranged in different positions of the device 1 to detect a respective plurality of normal and tangential forces present in the respective positions, and to generate a respective plurality of first electrical signals (Sn1-Sn4) and a respective plurality of second electrical signals (St1-St4).

According to several possible implementations, therefore, the "sensor" or "sensor assembly", as a whole, comprises a plurality of N sensor groups, each of which comprises M (one or more) sensor elements which generate M electrical signals (conventionally, the sensor elements are at least two, and generate at least two corresponding electrical signals $Sn_M$ and $St_M$). The device, as described more in detail below, is capable of both determining the normal and tangential components of the force acting on each point in which a sensor element is located (on the basis of the M electrical signals generated by the respective sensor elements) and estimating the normal and tangential components of an overall force (for example, a value resulting from such components) acting on the casing 2 of the device, on the basis of the plurality of M×N electrical signals mentioned above.

In the examples shown in FIGS. 1-3, the number N of sensor assemblies for each washer device is 4 (each is a MEMS sensor assembly comprising, in turn, two or more MEMS sensor elements). In the examples of FIGS. 1-3, the four sensor assemblies, and the related interfaces, are located in an external circumferential region of the casing 2; they are angularly equally spaced (i.e., in this case, spaced angularly by 90°).

In accordance with several implementation options, the number of assemblies may be one, or two or three, or may be greater than four.

According to a further implementation example, the device comprises a single electrical interface 4, connected to each of the sensor assemblies 3 by means of interconnections obtained internally to the device 1, and configured to transmit and make available all the electrical signals generated by the sensor elements of all the sensor assemblies comprised in the device 1.

In the example shown in FIG. 6, the device 1 comprises two sensor assemblies 3 and 3' and a single interface 4 locally connected to one of the sensor assemblies 3, and connected to the other sensor assembly 3' by means of an integrated interconnection 35.

According to an implementation option of the device 1, each of the sensor elements 31, 32 of the sensor assemblies 3 is mechanically constrained, either directly or indirectly, both to the upper face 20 and to the lower face 21 of the casing 2 of the device (i.e., by means of a constraint with other elements, in turn constrained to the face of the casing of the device).

According to an implementation option, each of the second sensor elements 32 of the sensor assemblies is mechanically constrained to the upper face 20 of the casing 2 and to a non-deformable column 22 having a base on the lower face of the casing 21.

According to another implementation example, each of the second sensor elements 32 of the sensor assemblies is mechanically constrained to a non-deformable column having a base on the upper face of the casing.

According to another implementation example, each of the second sensor elements 32 of the sensor assemblies is mechanically welded to a first non-deformable column having a base on the lower face of the casing and to a second non-deformable column having a base on the upper face of the casing.

In accordance with an embodiment, the device 1 further comprises electronic processing means 8, connected to the aforesaid electrical interface 4 to receive the one or more electrical signals (SA, SB) generated by the force sensor assembly 3, and configured to determine the normal force component fn and the tangential force component ft present in each of the one or more detection areas Z, on the basis the aforesaid one or more electrical signals received (SA, SB or Sn, St).

In the implementation option in which the device 1 comprises four sensor assemblies 3 (such as, for example in FIG. 2, in the positions indicated as N, O, S, E), the processing means 8 are configured to determine the normal force Fn acting on the device on the basis (for example, as an average) of the normal components fn detected from the four sensor assemblies. Furthermore, the processing means 8 are configured to determine the tangential force Ft acting on the device as a result of the tangential component acting along the first tangential direction to (as detected by the two sensor assemblies in the positions O, E) and of the tangential component acting along the second tangential direction tb (as detected by the two sensor assemblies in the positions S, N).

In accordance with an implementation option, the electronic processing means 8 are integrated in the device 1.

According to several implementation options (corresponding to the respective implementation options described above with reference to the signals generated by the sensors), the electronic processing means 8 are configured to determine the normal force component fn and the tangential force component ft on the basis of the aforesaid at least one first electrical signal Sn and at least one second electrical signal St (as shown in FIG. 5), or on the basis of the plurality of first electrical signals (Sn1-Sn4) and of the plurality of second electrical signals (St1-St4) generated by the sensor elements of the different sensor assemblies comprised in the device.

According to an implementation option (also shown in FIG. 5), the device 1 further comprises a third sensor element 33, integrated in the device 1, configured to detect a temperature value present in the detection portion, and to generate at least one third electrical signal Sc representative of the temperature detected.

In such case, the electronic processing means 8 are configured to determine the at least one normal force component fn and the at least one tangential force component ft on the basis of the aforesaid at least one first electrical signal Sn, at least one second electrical signal St and at least one third electrical signal Sc.

In accordance with an embodiment of the device, the first plane face of the first portion 20 of the casing 2 and the second plane face of the second portion 21 of the casing 2 have a surface alteration adapted to increase the friction of such first and second plane faces against the brake caliper detection portion and against the fastening and clamping means, respectively, with which the aforesaid first and second plane faces, in operating conditions, are respectively in contact.

According to an implementation option of the aforesaid embodiment, the aforesaid surface alteration of the plane faces is obtained by means of a "mechanical" finishing, per se known, for example a knurl.

According to another implementation option of the aforesaid embodiment, the aforesaid surface alteration of the plane faces is obtained by means of a texturing of the surface made with laser technology, or the like, with methods per se known, applicable on any metal surface, for example steel, titanium or aluminum.

According to another implementation option of the aforesaid embodiment, the aforesaid surface alteration of the plane faces is obtained by means of a coating. In this regard, different processes, per se known, may be used, such as, for example, the deposition of diamond particles, or Silicon Carbide, SiC, embedded in electrolytic nickel, or Electro-Spark Deposition (ESD) of tungsten carbide, stellite, or aluminum oxides, if the substrate is aluminum, or other known methods.

According to several possible implementation options, the aforesaid surface alteration of the plane faces is obtained by means of finishing by mechanical removal, or finishing by local material deformation (tracing, knurling), or laser removal (or finishing) which can cause the vaporization of the material, melting or combustion, or a plurality of possible coating techniques, for example, based on nanotechnologies, high-hardness nanopowders which generate contact points with high force exchange and therefore high friction, hard inclusions which locally carve the surface creating "holds", or other.

It should be noted that the embodiment described above allows to increase the friction between sensor and caliper body or suspension, which may be particularly advantageous in the context of the present invention in which, as already described above, the normal and tangential forces acting on the casing 2 determine a deformation of such casing which in turn determines normal (pressure) and tangential or lateral (shear) force components acting on the sensor.

In particular, the effect of this embodiment is to remove or significantly reduce phenomena of local variation of the stresses due to the inversion of the motion of the vehicle: in fact, by means of the measures taken, the friction coefficient on the interface surfaces is increased. Thereby, it is possible to avoid or significantly reduce those micro-adjustments which, when changing between forward and reverse travel, change the local friction conditions and, consequently, the distribution of the stresses on the surface of the casing (i.e., for example, washer). This is very important, because, if the local conditions change with each change of direction of the vehicle, the washer deforms differently and the sensor output characteristic will be not very repeatable and non-linear. Instead, by virtue of the aforesaid features of this embodiment, the effects induced by the braking torque on the sensitive elements between forward and reverse travel conditions are standardized and made deterministic, thus improving the repeatability and linearity of the sensor output characteristic.

A system for the simultaneous detection 10 of normal fn and tangential ft components of a force acting at a detection portion Z at a brake caliper 100, or at a suspension 200 of a vehicle wheel, is now described The system comprises a detection device 1 for a simultaneous detection of normal and tangential force components according to any one of the embodiments described above; and further comprises electronic processing means 8, operatively connected to the electrical interface 4 of the detection device 1 to receive the one or more electrical signals SA, SB generated by the force sensor assembly 3, and configured to determine the normal force component fn and at least one tangential force component ft present in the detection area or areas, on the basis of the aforesaid one or more electrical signals SA, SB generated by the sensor elements of the force sensor assembly 3.

Such system differs from the aforementioned embodiment of the device equipped with electronic processing means 8 in that, in this case, such electronic processing means 8 are not integrated in the device but are external to the device, and operationally and physically connected thereto.

For example, in several possible implementation options, the electronic processing means 8 are housed or mounted on a brake caliper 100 and/or a joint and/or a harness of a vehicle wheel.

In all the aforesaid cases, the electronic processing means 8 comprise, for example, one or more processors and relative memories, known per se, capable of executing software programs stored therein, adapted to perform the aforesaid processing steps.

Figure 8:
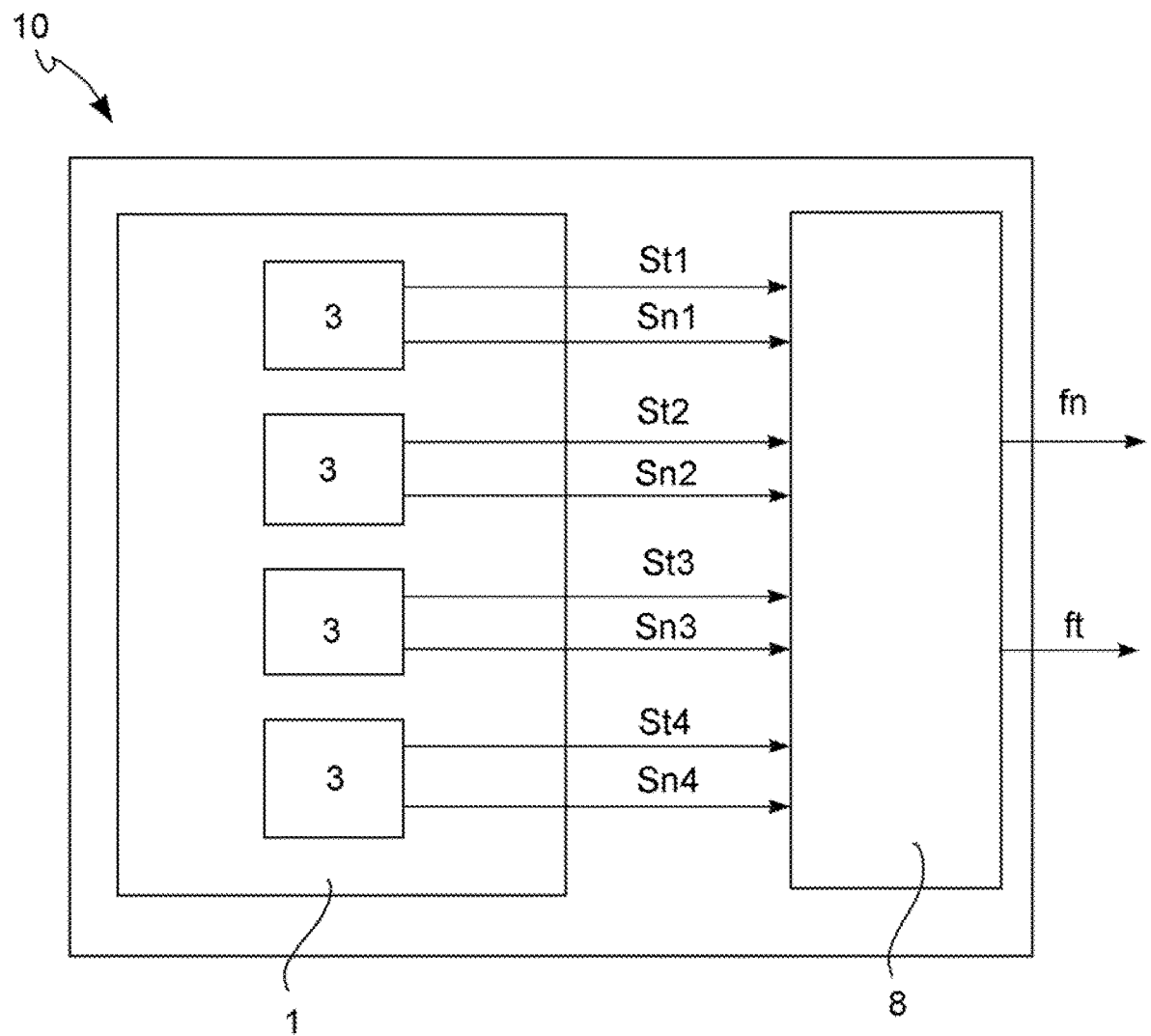
FIG. 8 shows a simplified block diagram of an embodiment of a system for the simultaneous detection of tangential and normal force components, according to the present invention.
Figure 9:
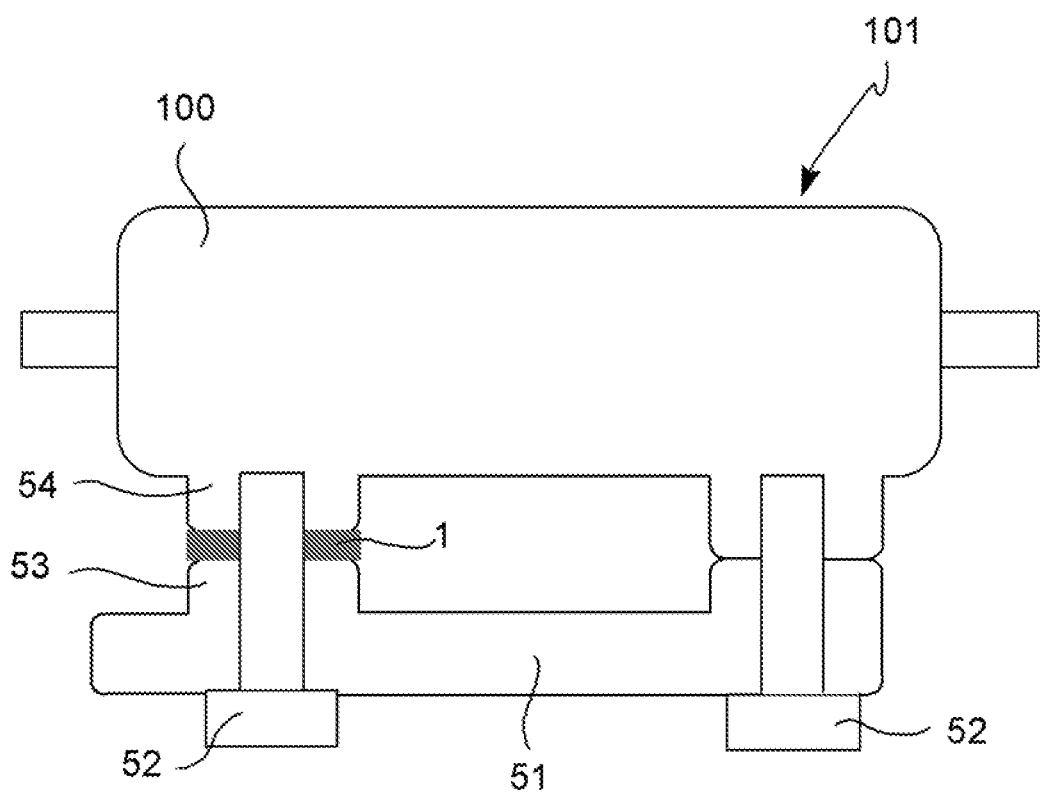
FIGS. 9 to 12 illustrate respective embodiments of a method for simultaneously detecting tangential and normal components of a force acting at a brake caliper of a vehicle wheel, and, at the same time, show several embodiments of a brake caliper system 101 with a braking force estimation function, comprised in the invention.
Figure 10:
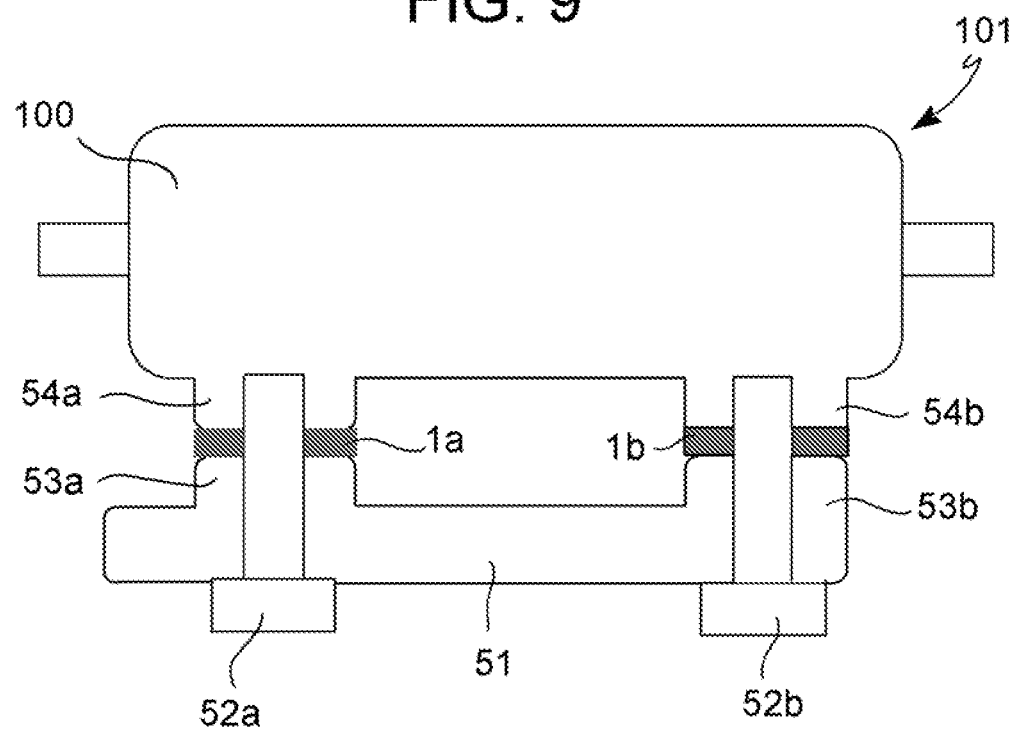
Figure 11:
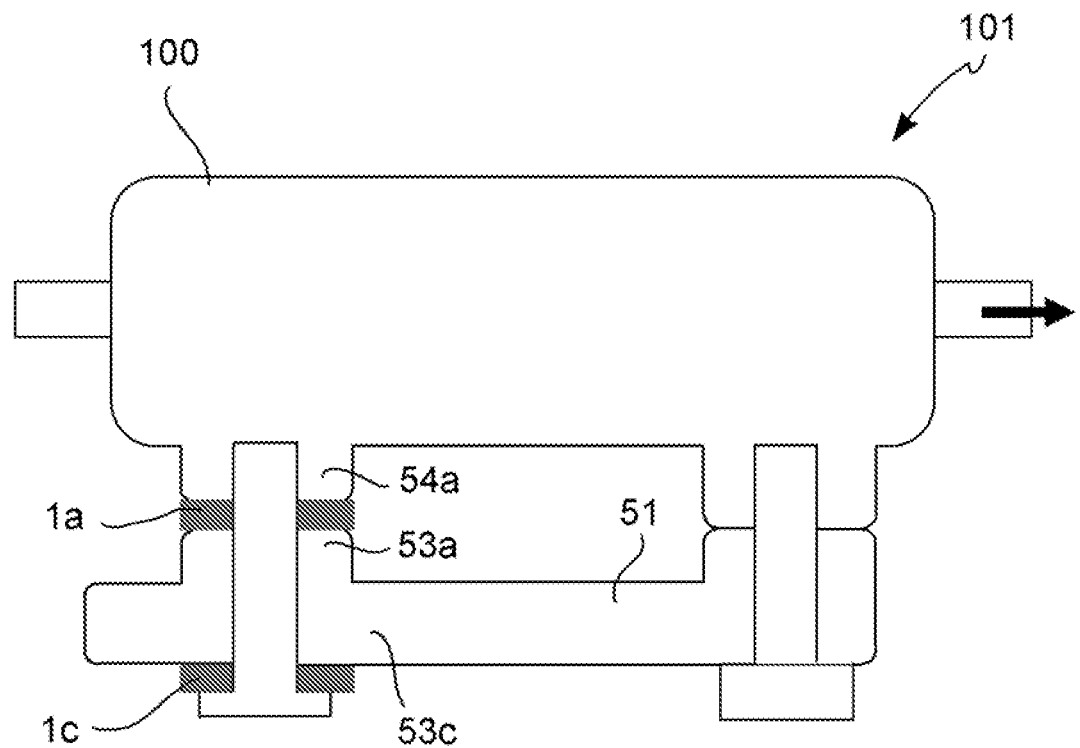
Figure 12:
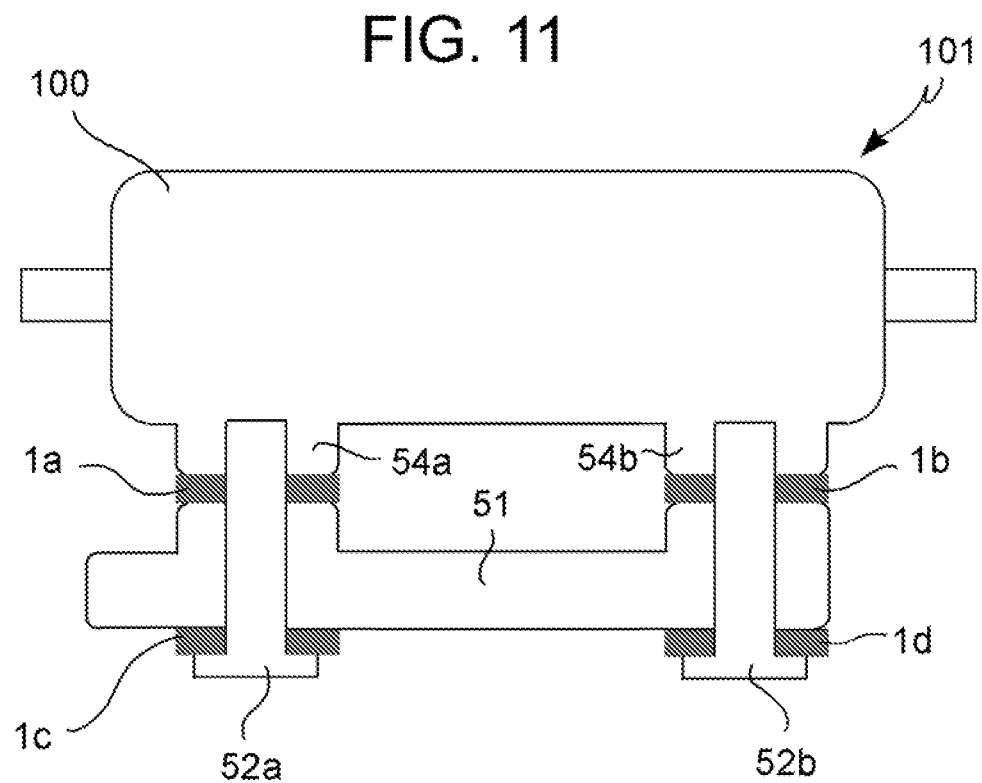
Figure 13:
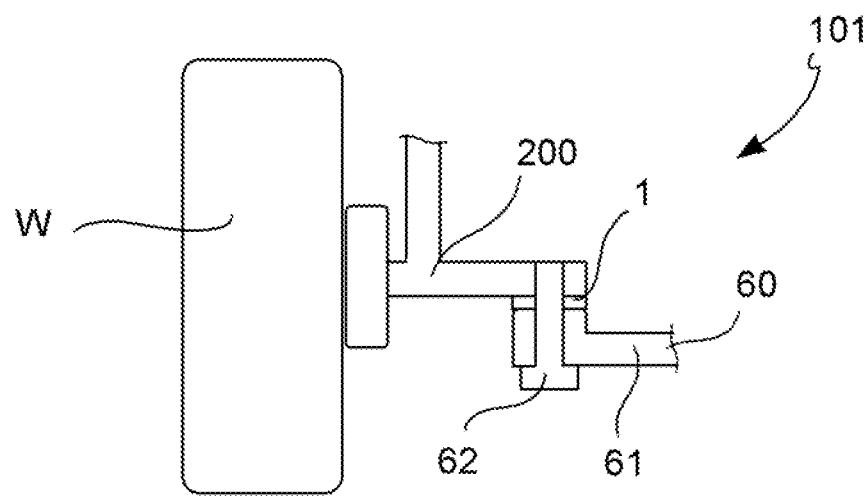
FIG. 13 shows an embodiment of a method for simultaneously detecting the tangential and normal force components exchanged between an axle and a suspension of a vehicle wheel, in accordance with the invention.
Figure 14A:
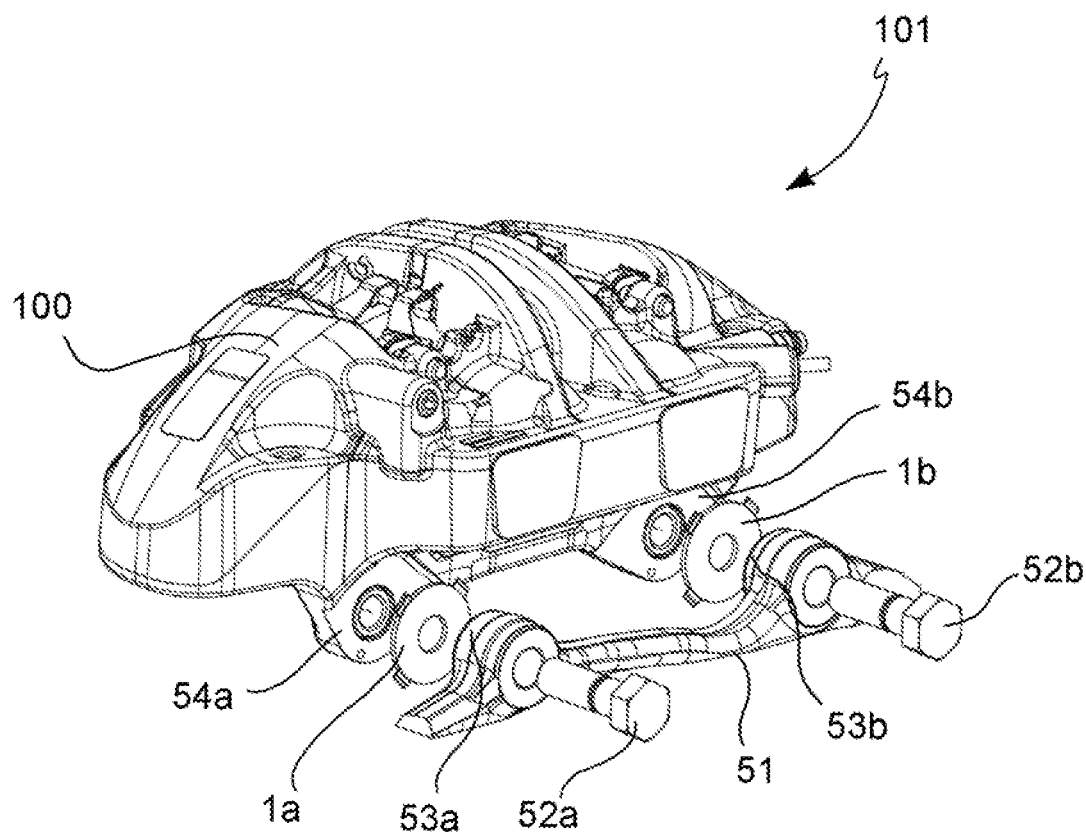
FIGS. 14A and 14B respectively show a detailed perspective view and a detailed lateral section of the brake caliper system of FIG. 10.
Figure 14B:
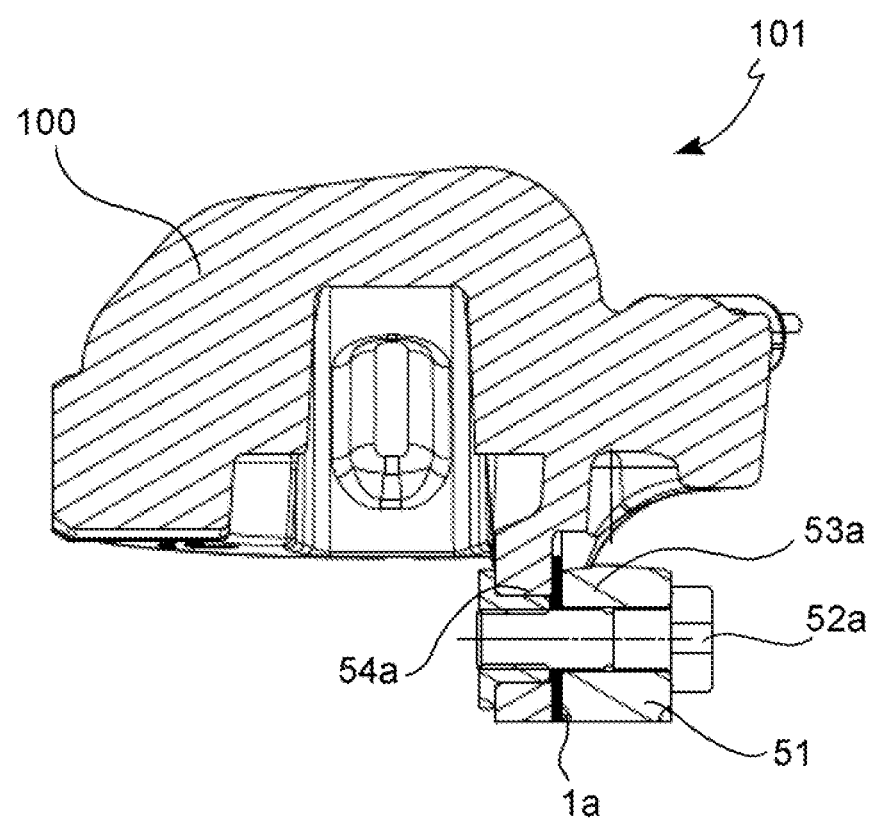

According to an embodiment of the system (illustrated, in particular, in the block diagram of FIG. 8), the detection device 1 comprises a plurality of sensor assemblies 3, each comprising one or more sensor elements capable of generating respective electrical signals (for example, two electrical signals St, Sn), and in which the electronic processing means 8 are configured to determine the normal force component fn and at least one of the tangential force components ft present in each of the detection areas corresponding to the positions of the sensor elements, on the basis of the plurality of electrical signals generated (St1-St4, Sn1-Sn4) by the respective plurality of sensor elements.

According to an implementation option (not explicitly shown, but easily deducible from FIG. 3), the aforesaid electrical signals, provided by the force sensors 3 and used by the electronic processing means 8 to determine the normal force component fn and at least one tangential force component ft, present in each of the detection areas, comprise a respective plurality of electrical signals representative of the temperature detected by a temperature sensor element 33 present in the force sensor assemblies 3.

A device for determining a braking force and/or torque due to the action of a vehicle brake caliper is now described, such a device comprising a detection device for the simultaneous detection 1 of the tangential and normal force components which includes electronic processing means 8.

In such case, the electronic processing means 8 are further configured to determine the aforesaid braking force and/or braking torque on the basis of the normal force component fn and of the tangential force component ft detected by the force sensor assembly 3 at at least one detection point.

A system for determining a braking force and/or braking torque due to the action of a vehicle brake caliper is now described, such a system comprising a detection system 10 for the simultaneous detection of normal and tangential force components according to any one of the embodiments described above.

In such case, the electronic processing means 8 are further configured to determine the aforesaid braking force and/or braking torque on the basis of the normal force component fn and of at least one tangential force component ft detected by the force sensor assembly (3) at at least one detection point.

The system and the device described above, relate to a particularly advantageous application of the technical solution, described above, capable of simultaneously determining normal and tangential force components acting at the sensors. The application consists in determining, on the basis of the aforesaid "local" force components (detected, for example, at attachment points of the brake caliper to the respective support) the braking force and/or torque acting on the brake caliper during a braking action.

According to an implementation option, the aforesaid step of determining the braking force and/or braking torque is based on a predefined relationship between the components of the force acting on the device and the force and/or torque acting on the brake caliper which generates them.

Such relationship may, for example, be defined in an initial characterization step of the brake caliper system comprising the detection devices, in conditions similar to the expected operating conditions.

The aforesaid experimental relationship, deriving from the characterization of the casing, is then stored in the electronic processing means 8, for example, in the form of a look-up table or in the form of one or more mathematical relationships which use parameters defined in the characterization step.

With reference to FIGS. 9-13, 14A and 14B, a method is now described for simultaneously detecting normal and tangential components of a force acting at a brake caliper of a vehicle wheel or of a force exchanged between an axle and a suspension of the wheel.

The method, first of all, involves firmly fastening, by means of support and fastening means 5, at least one detection device 1 to a respective detection portion Z at the brake caliper 100 or at the suspension 200 or at a joint between the suspension and the axle. The aforesaid at least one detection device 1 is a detection device for the simultaneous detection of normal and tangential force components, according to any one of the embodiments described above.

The method further comprises the steps of detecting, by means of a force sensor assembly 3 comprised in the device 1, a normal force component fn, representative of a normal force Fn acting on the casing 2 of the device 1 due to contact and pressure exerted by the support and fastening means 5 and by the detection portion Z, between which the device 1 is clamped; and further detecting, by means of said force sensor assembly 3 itself, at least one tangential force component ft, representative of a lateral or shear force Ft acting on the casing 2 of the device 1 due to contact and pressure exerted by the support and fastening means 5 and the detection portion Z, between which the device is clamped.

The method, finally, involves determining, by means of electronic processing means 8 operatively connected to the device 1, the tangential force Ft and the normal force Fn acting at the detection portion Z of the brake caliper, or the force exchanged between axle and suspension, on the basis of the tangential force component ft and of the normal force component fn detected by the device 1.

In accordance with an embodiment, the method uses a device 1 comprising at least one first force sensor assembly 3 and a second force sensor assembly 3', arranged in a position orthogonal with respect to each other.

The method comprises the step of detecting a respective normal force component along a direction n normal to the reference plane P and detecting a respective first tangential force component fta along a first tangential direction to of the reference plane P, by means of the first force sensor assembly 3.

The method further involves detecting a respective normal force component along a direction n normal to the reference plane P and detecting a respective second tangential force component ftb along a second tangential direction tb of the reference plane P, orthogonal to the first tangential direction tb, by means of the second force sensor assembly 3'.

The method then involves determining the normal force Fn and the tangential force Ft acting on the detection device 1 on the basis of both the normal force components fn detected by the two sensor assemblies, and the first tangential force component fta and the second tangential force component ftb detected.

According to an implementation option of the method, the aforesaid step of determining is based on a predefined relationship between the components of the force acting on the casing and the components of the local force acting on the sensor within the casing, which depends on the mechanical and deformation properties of the casing itself, and which, therefore, may, for example, be defined in an initial characterization step of the casing itself and of the system comprising the brake caliper and the device, in conditions similar to the expected operating conditions.

The aforesaid experimental relationship, deriving from the characterization of the casing, is then stored in the electronic processing means 8, for example, in the form of a look-up table or in the form of one or more mathematical relationships which use parameters defined in the characterization step.

In accordance with an embodiment (illustrated, for example, in the simplified diagram of FIG. 9), the method is aimed at simultaneously detecting the tangential and normal components of a force acting at a brake caliper 100 of a vehicle wheel. In such case, the aforesaid support and fastening means 5 comprise a brake caliper support 51 and at least one screw-like fastening element 52, and the step of fastening comprises clamping the aforesaid at least one device 1 between a plane portion of the brake caliper support 53 and a respective at least one attachment point 54, at the detection portion Z, of the brake caliper body, by means of the at least one screw-like fastening element 52, so that a first plane face of the first portion 20 of the device is in close contact with the attachment point 54 of the brake caliper body, and a second plane face of the second portion 21 of the device is in close contact with the plane portion 53 of the brake caliper support.

According to an embodiment of the method, the step of fastening comprises fastening a plurality of detection devices 1 to respective fastening points in respective detection areas, and the step of determining comprises determining the tangential and normal components of the force acting at each of the detection areas on the basis of the tangential and normal force components detected by the devices in the respective positions.

According to an embodiment of the method (illustrated, for example, in the simplified diagram of FIG. 10 and shown in the more detailed perspective view of FIG. 14A), the step of fastening comprises fastening a first detection device 1a at a first attachment point 54a of the brake caliper body, by means of a first screw-like fastening element 52a, and fastening a second detection device 1b at a second attachment point 54b of the brake caliper body, by means of a second screw-like fastening element 52b.

According to another embodiment of the method (illustrated, for example, in the simplified diagram of FIG. 11), the step of fastening comprises fastening a first detection device 1a by means of the screw-like fastening element 52a, between an attachment point 54a of the brake caliper body and a first plane portion of the brake caliper support 53a, and fastening a second detection device 1c between a second plane portion of the brake caliper support 53c and one end of the screw-like fastening element 52a.

According to a further embodiment of the method (illustrated, for example, in the simplified diagram of FIG. 12), the step of fastening comprises fastening a first detection device 1a and a second detection device 1c, by means of a first screw-like fastening element 52a, at a first attachment point 54a of the brake caliper body, and fastening a third detection device 1b and a fourth detection device 1d, by means of a second screw-like fastening element 52b, at a second attachment point 54b of the brake caliper body.

In accordance with an embodiment (illustrated, for example, in the simplified diagram of FIG. 13), the method aims at simultaneously detecting the tangential force and the normal force exchanged between an axle 60 and a suspension 200 of a vehicle wheel W. In such case, the support and fastening means 5 comprise means for attaching a suspension to an axle 61 equipped with at least one fastening element 62 (for example, screw-like), and the step of fastening comprises clamping the aforesaid at least one detection device 1 at the aforesaid suspension-axle attachment means 61, by means of the at least one fastening element 62.

A method is now described for determining a braking force and/or braking torque due to the action of a vehicle brake caliper, comprising the steps of executing a method for simultaneously detecting the tangential and normal force components according to any one of the embodiments described above, by a detection device according to any one of the embodiments described above; and determining, by means of electronic processing means, the braking force and/or braking torque on the basis of the normal force component and of the tangential force component detected by the detection device at at least one detection point.

In accordance with an embodiment, the aforesaid method comprises the steps of detecting the tangential and normal components of a plurality of forces, wherein such forces are forces acting at a plurality of detection areas of a brake caliper of a vehicle wheel or forces exchanged between an axle and a suspension of the wheel.

In such case, the step of determining comprises determining the braking force and/or torque on the basis of the normal and tangential components of the plurality of forces, detected by the detection device at the aforesaid plurality of detection areas.

As previously observed, an implementation option of such method provides that the aforesaid step of determining the braking force and/or braking torque is based on a predefined relationship between the components of the force acting on the device and the force and/or torque acting on the brake caliper which generates them.

Such relationship may, for example, be defined in an initial characterization step of the brake caliper system comprising the detection devices, in conditions similar to the expected operating conditions.

The aforesaid experimental relationship, deriving from the characterization of the casing, is then stored in the electronic processing means 8, for example, in the form of a look-up table or in the form of one or more mathematical relationships which use parameters defined in the characterization step.

According to an embodiment of the method, la step of determining comprises estimating an approximate braking force or braking torque value on the basis of the at least one tangential force component ft detected, or of two orthogonal tangential force components fta, ftb detected; therefore, performing a calibration and/or an adjustment of such approximate braking force or torque value, on the basis of the normal component fn, to obtain the braking force or torque.

With reference again to FIGS. 1, 9-13, 14a, 14b, a brake caliper system, with a braking force estimation function, 101 is now described, the brake caliper system comprising a brake caliper 100, a brake caliper support 51, fastening means 52, at least one force detection device 1 and electronic processing means 8.

The brake caliper 100 comprises a brake caliper body and at least one point for the attachment 54 to a support.

The fastening means 52 are configured to attach the brake caliper body 100 to the brake caliper support 51 at the aforesaid at least one attachment point 54, and are further configured to fasten the at least one detection device 1 at the at least one attachment point 54, so that the detection device 1 detects the normal component fn and at least one tangential component ft (or two orthogonal tangential components fta, ftb) of the force acting at the at least one attachment point 54.

The at least one detection device 1 is a detection device for the simultaneous detection of normal and tangential force components, according to any one of the embodiments described above.

The electronic processing means 8 are operatively connected to the electrical interface 4 of the detection device 1 to receive the one or more electrical signals SA, SB generated by the force sensor 3, and are configured to determine the braking force and/or the normal force Fn and/or the tangential force Ft acting on each of the at least one detection device 1 on the basis of the aforesaid one or more electrical signals SA, SB generated by the sensor elements of the force sensor assembly 3, representative of the aforesaid normal force component fn and of the at least one tangential force component ft (or of the two orthogonal tangential force components fta, ftb) detected by the detection device 1.

According to several implementation options, the brake caliper system 101 is configured to execute a method for determining a braking force and/or braking torque according to any one of the embodiments described above.

In particular, according to an embodiment of the brake caliper system 101 (illustrated, for example, in the simplified diagram of FIG. 9), it comprises a single detection device 1. In such case, the aforesaid support and fastening means 5 comprise a brake caliper support 51 and a screw-like fastening element 52, and are configured to clamp the device 1 between a plane portion of the brake caliper support 53 and a respective at least one attachment point 54, at the detection portion Z, of the brake caliper body, by means of the at least one screw-like fastening element 52, so that a first plane face of the first portion 20 of the device is in close contact with the attachment point 54 of the brake caliper body, and a second plane face of the second portion 21 of the device is in close contact with the plane portion 53 of the brake caliper support.

According to other embodiments of the brake caliper system 101, it comprises a plurality of detection devices 1 fastened to respective fastening points in respective detection areas.

According to an implementation option (illustrated, for example, in the simplified diagram of FIG. 10 and shown in the more detailed perspective views of FIGS. 14a and 14b), the brake caliper system 101 comprises two detection devices: a first detection device 1a at a first attachment point 54a of the brake caliper body, fastened by means of a first screw-like fastening element 52a, and a second detection device 1b at a second attachment point 54b of the brake caliper body, fastened by means of a second screw-like fastening element 52b.

According to another implementation option (illustrated, for example, in the simplified diagram of FIG. 11), the brake caliper system 101 comprises two detection devices: a first detection device 1a, fastened by means of the screw-like fastening element 52a, between an attachment point 54a of the brake caliper body and a first plane portion of the brake caliper support 53a, and a second detection device 1c fastened between a second plane portion of the brake caliper support 53c and one end of the screw-like fastening element 52a.

According to an implementation option (illustrated, for example, in the simplified diagram of FIG. 12), the brake caliper system 101 comprises four detection devices: a first detection device 1a and a second detection device 1c, fastened by means of a first screw-like fastening element 52a, at a first attachment point 54a of the brake caliper body, and a third detection device 1c and a fourth detection device 1d, fastened by means of a second screw-like fastening element 52b, at a second attachment point 54b of the brake caliper body.

According to another implementation option, the brake caliper system 101 comprises three detection devices, of which two detection devices are fastened at a first attachment point of the brake caliper support, and one detection device is fastened at a second attachment point of the brake caliper support.

According to further embodiments, the brake caliper system 101 comprises one or more detection devices 1, arranged and fastened at other portions of the brake caliper, for example, detection devices arranged between the fastening pins of the pads and the brake caliper body.

As it may be noticed, the object of the present invention is fully achieved by the devices, systems and methods described above, by virtue of the functional and structural features thereof.

In fact, the detection device described above is capable of simultaneously detecting, and with good accuracy, each of the tangential and normal forces acting in one or more detection points, at a brake caliper or a suspension of a vehicle wheel, by virtue of the presence of a force sensor assembly enclosed in a robust and compact casing/package, capable of transferring the forces acting thereon into the sensors contained therein.

Thereby, the detection device may be effectively used even in particular environmental conditions, such as exposure to high thermal excursion ranges (the device is capable of operating up to high temperatures, for example 250° C.) and exposure to humidity, water and other bad weather.

Furthermore, by virtue of the small size thereof and the "washer" shape thereof, such detection device may be advantageously and easily inserted between the apparatus of a wheel and the axle of a vehicle, using already provided fastening means (for example, the screws already provided for the attachment of the brake caliper to the support thereof, one or more attachment points).

As described above, the possible arrangements of the device with respect to the brake caliper or suspension or other parts or joints of the connection means between the braking system of a wheel and the vehicle axle may be numerous. This allows, on the one hand, a great versatility of use, allowing the most varied structural options, and on the other hand, it provides degrees of freedom to obtain different levels of accuracy according to the requirements: for example, the solutions involving a plurality of devices, arranged in several points, and each with a plurality of sensor assemblies, offers a greater quantity of detections and respective electrical signals to the control system, which allow more precise processing and estimates.

Furthermore, both by virtue of the properties of the force sensor assembly thereof and of the structural features described, the aforesaid detection device is capable of providing force measurements with high precision over a wide dynamic range, ranging from very high forces (for example, due to a high braking torque, such as an emergency brake) up to, conversely, very low forces (for example, due to residual torques acting on the braking system).

Furthermore, the device is capable of independently detecting an axial force (for example, for measuring the clamping force on the screw used for fastening two components of the vehicle, for example, the brake caliper and the support) and the relative dynamic variations, and a lateral force (for example, usable for an indirect measurement of a braking torque).

Other advantages of the device for measuring tangential and normal forces, according to the invention, are compactness, robustness, simplicity of assembly (using, for example, the fastening systems already provided for fastening the brake caliper), the versatility of use in contexts of fixed or floating caliper disc brakes, and in different points and/or joints and/or junctions of such systems.

Similar advantages are obtained by virtue of the system and the method for detecting tangential and normal forces, and by virtue of the brake caliper system with a brake caliper braking force estimation function, described above.

The features indicated above allow to obtain precise measurements of tangential and normal forces acting at one or more detection points, for example, of a brake caliper, which is in itself very useful, in general, for numerous applications in the electronic control of a braking system.

As already noted, among the most useful applications, there is that of estimating and/or determining the braking force and/or braking torque acting in real time during a braking action on the basis of the normal and tangential force components detected. This result is obtained by means of the device and/or the system and/or the method for determining a braking force and/or braking torque, described above.

A skilled person in the field, in order to satisfy contingent and specific needs, may modify, adapt and replace numerous elements of the embodiments described above with other functionally equivalent, without however departing from the scope of the following claims. Each of the features described as belonging to a possible embodiment may be achieved irrespective of the other embodiments described.

The invention claimed is:

1. A detection device for a simultaneous detection of normal and tangential components of a force acting in a detection portion at a brake caliper or at a suspension of a vehicle wheel, wherein the detection device comprises:
    a plate-shaped casing mainly extending along a reference plane (P), said plate-shaped casing being formed by a first and a second portions constrained and/or welded to each other, wherein the first portion has, towards outside of the plate-shaped casing, a first plane face, parallel to the reference plane (P), adapted to be placed in close contact with said detection portion, and the second portion has, towards outside of the plate-shaped casing, a second plane face parallel to the reference plane (P), adapted to be placed in close contact with fastening and clamping means;
    a force sensor assembly, housed in said plate-shaped casing, and mechanically constrained and/or welded to said first portion and second portion of the plate-shaped casing, wherein the force sensor assembly is configured to detect:
        a normal force component, in a direction normal to the reference plane (P), transmitted thereto by contact and pressure by the plate-shaped casing, representative of a normal force acting on the plate-shaped casing, and
        at least one tangential force component, in at least one respective tangential direction defined by the reference plane (P), transmitted thereto by contact and pressure by the plate-shaped casing, representative of a tangential force acting on the plate-shaped casing, and wherein
        the force sensor assembly is configured to generate, by piezo-resistive effect, one or more electrical signals representative of the normal force component and of the at least one tangential force component detected; and
    an electrical interface integrated in the plate-shaped casing and connected to the force sensor assembly to conduct and make said one or more generated electrical signals available.

2. The detection device of claim 1, wherein said plate-shaped casing is a disc-like plate-shaped casing or a washer-shaped casing, further comprising at least one opening obtained on the plate-shaped casing, said at least one opening being adapted to cooperate with fastening and clamping means comprising external screw-like fastening and clamping means, to ensure that the detection device is fastened and pressed to a part of the vehicle wheel and/or of the brake caliper and/or of the suspension of the vehicle wheel.

3. The detection device of claim 2, further comprising coupling elements, configured to couple with respective parts of a fastening area of the brake caliper, or the suspension or other wheel part to which the detection device is to be attached, so as to define a correct mutual fastening position.

4. The detection device of claim 1, wherein said plate-shaped casing is formed by two portions detachable from and reconnectable to each other.

5. The detection device of claim 1, wherein the force sensor assembly comprises at least one biaxial force sensor assembly comprising:
    at least one normal force first sensor element, configured to detect said normal force component and to generate at least one first electrical signal;
    at least one tangential force second sensor element, configured to detect said at least one tangential force component and to generate at least one second electrical signal;
    wherein the set of said at least one first electrical signal and said at least one second electrical signal is representative of both the detected normal force component and at the detected least one tangential force component.

6. The detection device of claim 5, wherein said at least one first electrical signal is an electrical signal representative of the detected normal force component, and said at least one second electrical signal is an electrical signal representative of the at least one detected tangential force component.

7. The detection device of claim 5, wherein at least one of said force sensor assembly, biaxial force sensor assembly, at least one normal force first sensor element and at least one tangential force second sensor element, comprises piezo-resistive sensors made with Micro-Electro-Mechanical Systems (MEMS) technology.

8. The detection device of claim 5, comprising at least one first biaxial force sensor assembly and at least one second biaxial force sensor assembly, arranged in a position orthogonal with respect to each other, wherein
    the at least one first biaxial force sensor assembly is configured to detect a respective normal force component along a direction normal to the reference plane (P) and a respective first tangential force component along a first tangential direction of the reference plane (P), and wherein
    the at least one second biaxial force sensor assembly is configured to detect a respective normal force component along the direction normal to the reference plane (P) and a respective second tangential force component along a second tangential direction of the reference plane (P), orthogonal to the first tangential direction,
    so that the detection device is capable of determining the normal force and the tangential force acting on the detection device on the basis of both normal force components detected by the at least one first and at least one second biaxial force sensor assemblies, and the detected first tangential force component and second tangential force component.

9. The detection device of claim 5, comprising a plurality of biaxial force sensor assemblies, arranged in different positions of the detection device to detect a respective plurality of normal and tangential force components in respective positions and generate a respective plurality of first electrical signals and a respective plurality of second electrical signals.

10. The detection device of claim 5, wherein each of the sensor elements of the at least one biaxial force sensor assembly is mechanically constrained, either directly or indirectly, both to the first portion and to the second portion of the plate-shaped casing of the detection device, and wherein the force sensor assembly comprises a first chip and a second chip operatively connected to each of said at least one normal force first sensor element and at least one tangential force second sensor element.

11. The detection device of claim 1, further comprising electronic processing means, connected to said electrical interface to receive the one or more electrical signals generated by the force sensor assembly, and configured to determine the normal force component and the at least one tangential force component present in one or more detection portions, on the basis of said one or more received electrical signals,
wherein said electronic processing means are integrated in the detection device,
and wherein the electronic processing means are configured to determine said normal force component and at least one tangential force component on the basis of said at least one first electrical signal and at least one second electrical signal,
or to determine said respective plurality of normal and tangential force components on the basis of the respective plurality of the first electrical signals and of the respective plurality of second electrical signals.

12. The detection device of claim 1, further comprising a third sensor element, integrated in the detection device, and configured to detect a temperature value present in the detection portion, and to generate at least one third electrical signal representative of the detected temperature value,
and wherein the electronic processing means are configured to determine said normal force component and at least one tangential force component on the basis of said at least one first electrical signal, at least one second electrical signal and at least one third electrical signal.

13. The detection device of claim 1, wherein the first plane face of the first portion of the plate-shaped casing and the second plane face of the second portion of the plate-shaped casing have a surface alteration adapted to increase friction of said first and second plane faces against the detection portion and against the fastening and clamping means, respectively, with which said first and second plane faces, under operating conditions, are respectively in contact,
wherein said surface alteration of the first plane face of the first portion of the plate-shaped casing and of the second plane face of the second portion of the plate-shaped casing is obtained by:
mechanical finishing; or
texturing by laser technology; or
coating.

14. A system for simultaneously detecting normal and tangential components of a force acting at a detection portion at a brake caliper or a suspension of a vehicle wheel, wherein the system comprises:
a detection device for a simultaneous detection of normal and tangential force components of a force acting in a detection portion at a brake caliper or at a suspension of a vehicle wheel, wherein the detection device comprises:
a plate-shaped casing mainly extending along a reference plane (P), said plate-shaped casing being formed by a first and a second portions constrained and/or welded to each other, wherein the first portion has, towards outside of the plate-shaped casing, a first plane face, parallel to the reference plane (P), adapted to be placed in close contact with said detection portion, and the second portion has, towards outside of the plate-shaped casing, a second plane face parallel to the reference plane (P), adapted to be placed in close contact with fastening and clamping means;
a force sensor assembly, housed in said plate-shaped casing, and mechanically constrained and/or welded to said first portion and second portion of the plate-shaped casing, wherein the force sensor assembly is configured to detect:
a normal force component, in a direction normal to the reference plane (P), transmitted thereto by contact and pressure by the plate-shaped casing, representative of a normal force acting on the plate-shaped casing, and
at least one tangential force component, in at least one respective tangential direction defined by the reference plane (P), transmitted thereto by contact and pressure by the plate-shaped casing, representative of a tangential force acting on the plate-shaped casing, and wherein
the force sensor assembly is configured to generate, by piezo-resistive effect, one or more electrical signals representative of the normal force component and of the at least one tangential force component detected;
an electrical interface integrated in the plate-shaped casing and connected to the force sensor assembly to conduct and make said one or more generated electrical signals available;
and wherein the system further comprises:
electronic processing means, operatively connected to the electrical interface of the detection device to receive the one or more electrical signals generated by the force sensor assembly, and configured to determine the normal force component and at least one tangential force component in the detection portion, on the basis of said one or more electrical signals.

15. The system of claim 14, wherein said electronic processing means are housed or mounted on at least one of a brake caliper, a joint, and a harness of the vehicle wheel.

16. The system of claim 15, wherein the detection device comprises a plurality of biaxial force sensor assemblies, each biaxial force sensor assembly comprising at least one normal force first sensor element, configured to detect said normal force component and to generate at least one first electrical signal and at least one tangential force second sensor element, configured to detect said at least one tangential force component and to generate at least one second electrical signal, wherein the set of said at least one first electrical signal and said at least one second electrical signal is representative of both the detected normal force component and at least one tangential force component,
said plurality of biaxial force sensor assemblies being arranged in different positions of the detection device to detect a respective plurality of normal and tangential force components in respective positions and generate a respective plurality of first electrical signals and a respective plurality of second electrical signals, and wherein the electronic processing means are configured to determine the normal force component and the at least one tangential force component in the detection portions corresponding to positions of the sensor elements, on the basis of the plurality of first electrical signals and the plurality of second electrical signals generated by the at least one normal force first sensor element and at least one tangential force second sensor element.

17. A system for determining a braking force and/or torque due to action of a vehicle brake caliper, comprising a system for simultaneously detecting normal and tangential force components according to claim 14, wherein the electronic processing means are further configured to determine said braking force and/or torque on the basis of the normal force component and of at least one tangential force component detected by the force sensor assembly at the detection portion.

18. A method for simultaneously detecting normal and tangential components of a force acting at a brake caliper of a vehicle wheel or of a force exchanged between an axle and a suspension of the vehicle wheel, said method comprising:
   firmly fastening, by fastening and clamping means, at least one detection device to a respective detection portion at the brake caliper or at the suspension or at a joint between the suspension and the axle, wherein said at least one detection device is a detection device for a simultaneous detection of normal and tangential force components of a force acting in a detection portion at a brake caliper or at a suspension of a vehicle wheel, the detection device comprising:
      a plate-shaped casing mainly extending along a reference plane (P), said plate-shaped casing being formed by a first and a second portions constrained and/or welded to each other, wherein the first portion has, towards outside of the plate-shaped casing, a first plane face, parallel to the reference plane (P), adapted to be placed in close contact with said detection portion, and the second portion has, towards outside of the plate-shaped casing, a second plane face parallel to the reference plane (P), adapted to be placed in close contact with external screw-like fastening and clamping means;
      a force sensor assembly, housed in said plate-shaped casing, and mechanically constrained and/or welded to said first portion and second portion of the plate-shaped casing, wherein the force sensor assembly is configured to detect:
      a normal force component, in a direction normal to the reference plane (P), transmitted thereto by contact and pressure by the plate-shaped casing, representative of a normal force acting on the plate-shaped casing, and at least one tangential force component, in at least one respective tangential direction defined by the reference plane (P), transmitted thereto by contact and pressure by the plate-shaped casing, representative of a tangential force acting on the plate-shaped casing, and wherein the force sensor assembly is configured to generate, by piezo-resistive effect, one or more electrical signals representative of the normal force component and of the at least one tangential force component detected; and
      an electrical interface integrated in the plate-shaped casing and connected to the force sensor assembly to conduct and make said one or more generated electrical signals available;
   wherein the method further comprises:
      detecting, by said force sensor assembly of said detection device, a normal force component, representative of a normal force the first portion and second portion of the plate-shaped casing are subjected to, due to contact and pressure exerted by the fastening and clamping means and by the detection portion, between which the detection device is clamped;
      detecting, by said force sensor assembly of said detection device, the at least one tangential force component, representative of the tangential force the first portion and second portion of the plate-shaped casing are subjected to, due to contact and pressure exerted by the fastening and clamping means and by the detection portion, between which the detection device is clamped; and
      determining, by electronic processing means operatively connected to detection device, the at least one tangential force and the normal force acting in the detection portion of the brake caliper, or the force exchanged between the axle and the suspension, on the basis of the at least one tangential force component and of the normal force component detected by the detection device.

19. The method of claim 18, wherein said detection device comprises at least one first biaxial force sensor assembly and at least one second biaxial force sensor assembly, arranged in a position orthogonal with respect to each other, said method further comprising:
   detecting a respective normal force component along a direction normal to the reference plane (P) and detecting a respective first tangential force component along a first tangential direction of the reference plane (P), by the at least one first biaxial force sensor assembly;
   detecting the respective normal force component along the direction normal to the reference plane (P) and detecting a respective second tangential force component along a second tangential direction of the reference plane (P), by the at least second biaxial force sensor assembly; and
   determining the normal force and the at least one tangential force acting on the detection device on the basis of both normal force components detected by the at least one first and the at least one second biaxial sensor assemblies, and the detected first tangential force component and second tangential force component.

20. The method of claim 18, aimed at simultaneously detecting the tangential and normal components of the force acting at a brake caliper of the vehicle wheel,
   wherein said fastening and clamping means comprise a brake caliper support and at least one external screw-like fastening element,
   and wherein the fastening step comprises clamping said at least one detection device between a plane portion of the brake caliper support and at least one respective attachment point of the brake caliper, by the at least one screw-like fastening element, so that a first plane face of the first portion of the at least one detection device is in close contact with the brake caliper, and a second plane face of the second portion of the detection device is in close contact with said plane portion of the brake caliper support.

21. The method of claim 20, wherein
the fastening step comprises, fastening a plurality of detection devices to respective fastening points in respective detection portions, or wherein
the fastening step comprises fastening a first detection device at a first attachment point of the brake caliper, by a first screw-like fastening element, and fastening a second detection device at a second attachment point of the brake caliper, by a second screw-like fastening element, or wherein
the fastening step comprises fastening a first detection device, by a first screw-like fastening element, between a first attachment point of the brake caliper and a first plane portion of the brake caliper support, and fastening a second detection device between a second plane portion of the brake caliper support and one end of the first screw-like fastening element, or wherein
the fastening step comprises fastening a first detection device and a second detection device, by a first screw-like fastening element, at a first attachment point of the brake caliper, and fastening a third detection device and a fourth detection device, by a second screw-like fastening element, at a second attachment point of the brake caliper;
and wherein the determining step comprises determining the tangential and normal components of the force acting at the detection portions on the basis of the tangential and normal force components detected by the detection devices in the respective positions.

22. The method of claim 18, aimed at simultaneously detecting the tangential force and the normal force exchanged between the axle and the suspension of the vehicle wheel,
wherein said fastening and clamping means comprise means for attaching the suspension to the axle equipped with at least one fastening element,
and wherein the fastening step comprises clamping said at least one detection device at said means for attaching the suspension to the axle, by the at least one fastening element.

23. A method for determining a braking force and/or torque due to action of a vehicle brake caliper, comprising:
executing a method for simultaneously detecting normal and tangential force components according to claim 18, by means of a detection device for a simultaneous detection of normal and tangential components of a force acting in a detection portion at a brake caliper or at a suspension of a vehicle wheel, wherein the detection device comprises:
a plate-shaped casing mainly extending along a reference plane (P), said plate-shaped casing being formed by a first and a second portions constrained and/or welded to each other, wherein the first portion has, towards outside of the plate-shaped casing, a first plane face, parallel to the reference plane (P), adapted to be placed in close contact with said detection portion, and the second portion has, towards outside of the plate-shaped casing, a second plane face parallel to the reference plane (P), adapted to be placed in close contact with external screw-like fastening and clamping means;
a force sensor assembly, housed in said plate-shaped casing, and mechanically constrained and/or welded to said first portion and second portion of the plate-shaped casing, wherein the force sensor assembly is configured to detect a normal force component, in a direction normal to the reference plane (P), transmitted thereto by contact and pressure by the plate-shaped casing, representative of a normal force acting on the plate-shaped casing, and at least one tangential force component, in at least one respective tangential direction defined by the reference plane (P), transmitted thereto by contact and pressure by the plate-shaped casing, representative of a tangential force acting on the plate-shaped casing, and wherein the force sensor assembly is configured to generate, by piezo-resistive effect, one or more electrical signals representative of the normal force component and of the at least one tangential force component detected; and
an electrical interface integrated in the plate-shaped casing and connected to the force sensor assembly to conduct and make said one or more generated electrical signals available,
said detection device further comprising electronic processing means, connected to said electrical interface to receive the one or more electrical signals generated by the force sensor assembly, and configured to determine the normal force component and the at least one tangential force component in each detection portion, on the basis of said received one or more electrical signals received; and
wherein the method further comprises determining, by the electronic processing means, said braking force and/or torque on the basis of the normal force component and of the at least one tangential force component detected by the detection device at at least one detection portion.

24. The method of claim 23, further comprising detecting the normal and tangential force components of a plurality of forces, said forces being forces acting at a plurality of detection portions of the brake caliper of the vehicle wheel or forces exchanged between an axle and the suspension of the vehicle wheel,
wherein the determining step comprises determining said braking force and/or torque on the basis of the normal and tangential components of said plurality of forces, detected by the detection device at said plurality of detection portions.

25. The method of claim 24, wherein the determining step comprises:
estimating an approximate braking force or torque value on the basis of the at least one detected tangential force component, or of two detected orthogonal tangential force components; and
performing a calibration and/or an adjustment of said approximate braking force or torque value, on the basis of the normal component, to obtain the braking force or torque.

26. A brake caliper system with braking force estimation function, comprising:
a brake caliper, having a brake caliper body and at least one attachment point to a support;
a brake caliper support;
at least one detection device;
fastening and clamping means, configured to attach the brake caliper body to the brake caliper support at said at least one attachment point,
the fastening and clamping means being further configured to fasten said at least one force detection device at said at least one attachment point, so that the at least one detection device detects the normal component and at least one tangential component, or two orthogonal tangential components of the force acting at said at least one attachment point, wherein said at least one detection device is a device for a simultaneous detection of normal and tangential force components of a force acting in a detection portion at a brake caliper or at a suspension of a vehicle wheel, wherein the detection device comprises:
- a plate-shaped casing mainly extending along a reference plane (P), said plate-shaped casing being formed by a first and a second portions constrained and/or welded to each other, wherein the first portion has, towards outside of the plate-shaped casing, a first plane face, parallel to the reference plane (P), adapted to be placed in close contact with said detection portion, and the second portion has, towards outside of the plate-shaped casing, a second plane face parallel to the reference plane (P), adapted to be placed in close contact with external screw-like fastening and clamping means;
- a force sensor assembly, housed in said plate-shaped casing, and mechanically constrained and/or welded to said first portion and second portion of the plate-shaped casing, wherein the force sensor assembly is configured to detect a normal force component, in a direction normal to the reference plane (P), transmitted thereto by contact and pressure by the plate-shaped casing, representative of a normal force acting on the plate-shaped casing, and at least one tangential force component, in at least one respective tangential direction defined by the reference plane (P), transmitted thereto by contact and pressure by the plate-shaped casing, representative of a tangential force acting on the plate-shaped casing, and wherein the force sensor assembly is configured to generate, by piezo-resistive effect, one or more electrical signals representative of the normal force component and of the at least one tangential force component detected; and
- an electrical interface integrated in the plate-shaped casing and connected to the force sensor assembly to conduct and make said one or more generated electrical signals available; and wherein the brake caliper system further comprises:

electronic processing means, operatively connected to the electrical interface of the detection device to receive the one or more electrical signals generated by the force sensor assembly, and configured to determine the braking force and/or the normal force and/or the tangential force acting on the at least one detection device on the basis of said one or more electrical signals, representative of said normal force component and of the at least one tangential force component, or of two orthogonal tangential force components detected by the at least one detection device.

27. The brake caliper system of claim 26 wherein:

said brake caliper system comprises a single detection device, and the fastening and clamping means comprise a brake caliper support and a screw-like fastening element, said fastening and clamping means being configured to clamp the detection device between a plane portion of the brake caliper support and a respective attachment point of the brake caliper body, by the screw-like fastening element, so that a first plane face of the first portion of the detection device is in close contact with the respective attachment point of the brake caliper body, and a second plane face of the second portion of the detection device is in close contact with the plane portion of the brake caliper support;

or wherein:

said brake caliper system comprises a plurality of detection devices fastened to respective attachment points in respective detection portions;

or wherein:

said brake caliper system comprises two detection devices: a first detection device at a first attachment point of the brake caliper body, fastened by a first screw-like fastening element, and a second detection device at a second attachment point of the brake caliper body, fastened by a second screw-like fastening element;

or wherein:

said brake caliper system comprises two detection devices: a first detection device, fastened by the screw-like fastening element, between a first attachment point of the brake caliper body and a first plane portion of the brake caliper support, and a second detection device fastened between a second plane portion of the brake caliper support and one end of the first screw-like fastening element;

or wherein:

said brake caliper system comprises four detection devices: a first detection device and a second detection device, fastened by a first screw-like fastening element, at a first attachment point of the brake caliper body, and a third detection device and a fourth detection device, fastened by a second screw-like fastening element, at a second attachment point of the brake caliper body;

or wherein:

said brake caliper system comprises three detection devices, two detection devices being fastened at a first attachment point of the brake caliper support, and one detection device being fastened at a second attachment point of the brake caliper support;

or wherein said brake caliper system comprises one or more detection devices, arranged and fastened at respective fastening pins of brake caliper.

* * * * *